Dec. 18, 1956  K. F. GALLIMORE  2,774,250
MULTI-SPEED TRANSMISSION FOR MACHINE TOOLS
Filed July 30, 1954  14 Sheets-Sheet 5

INVENTOR
Keith F. Gallimore
by Carlson, Pitzner, Hubbard & Wolfe
ATTORNEYS

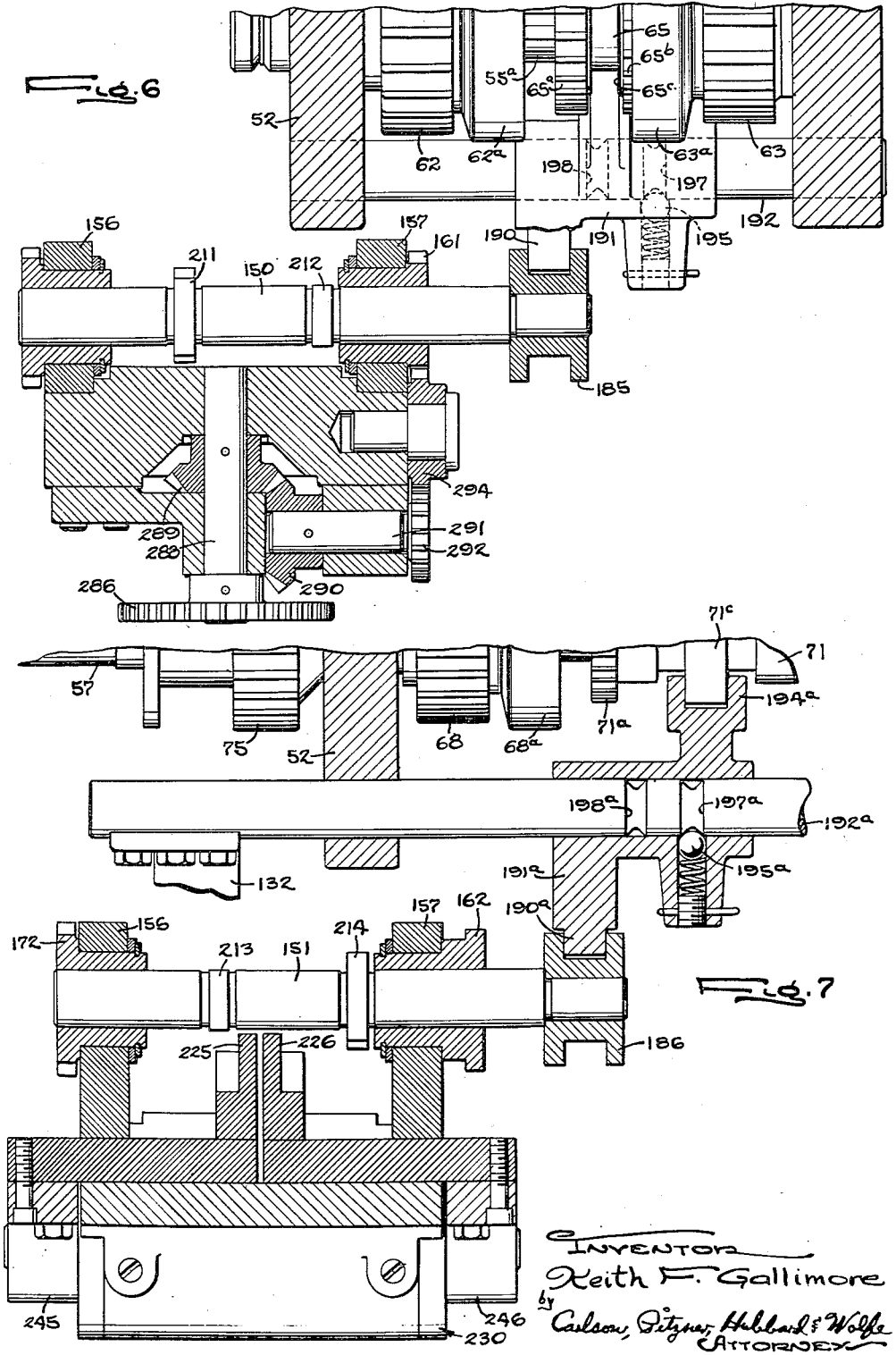

Dec. 18, 1956  K. F. GALLIMORE  2,774,250
MULTI-SPEED TRANSMISSION FOR MACHINE TOOLS
Filed July 30, 1954  14 Sheets-Sheet 7
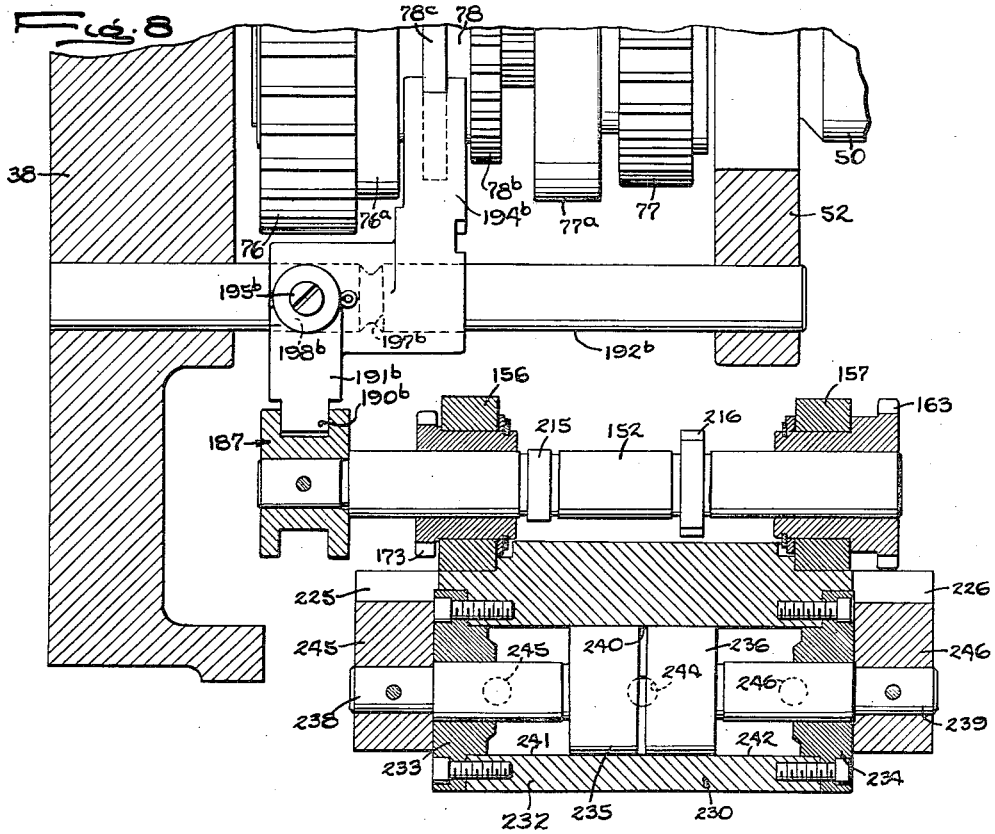
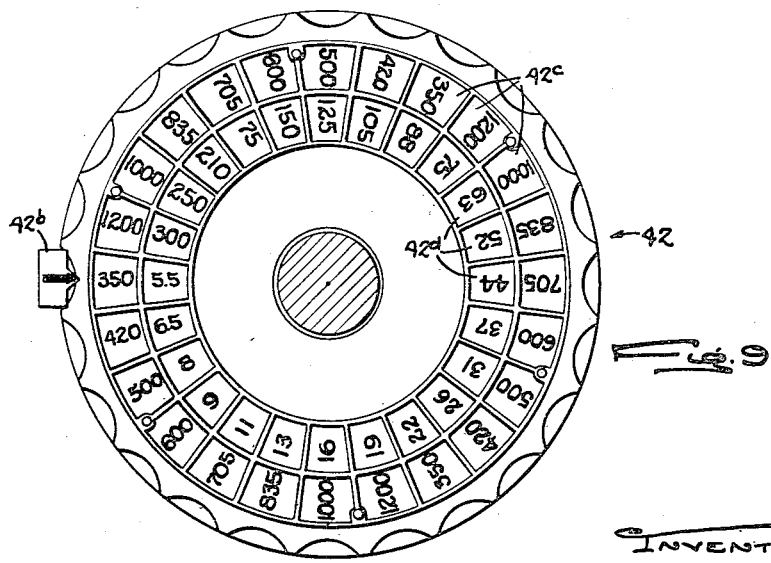
INVENTOR
Keith F Gallimore
by Carlson, Pitzner, Hubbard & Wolfe
ATTORNEY

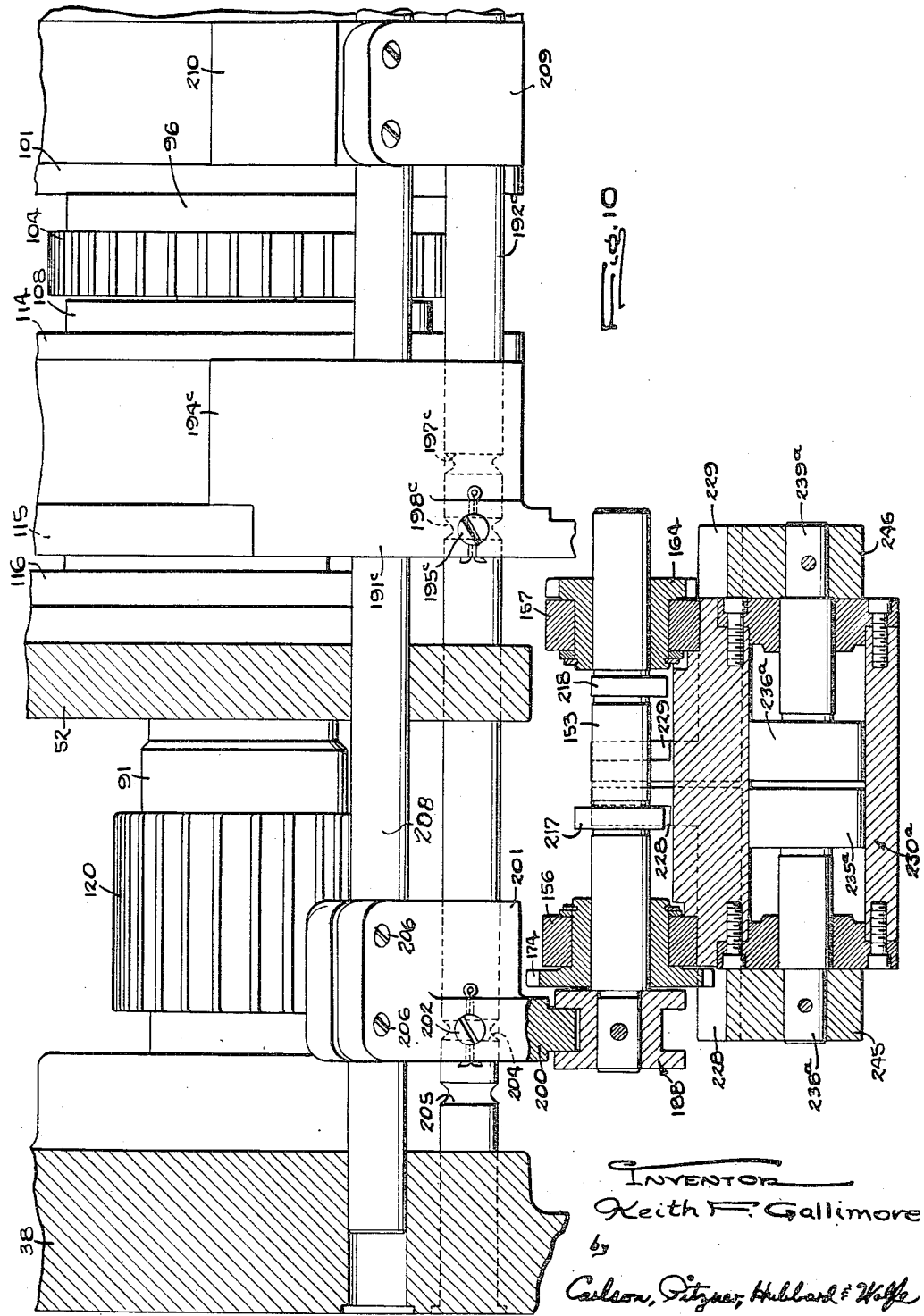

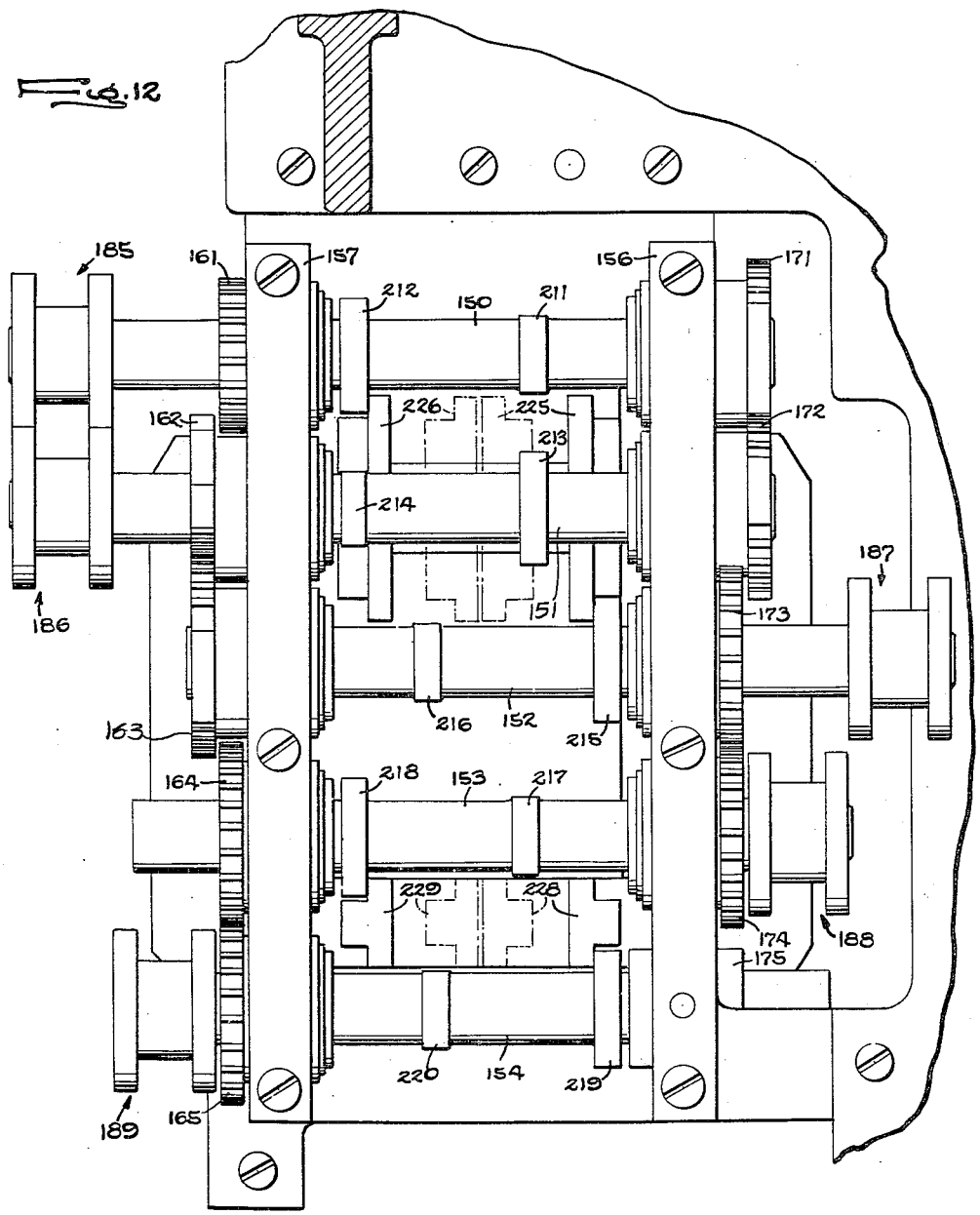

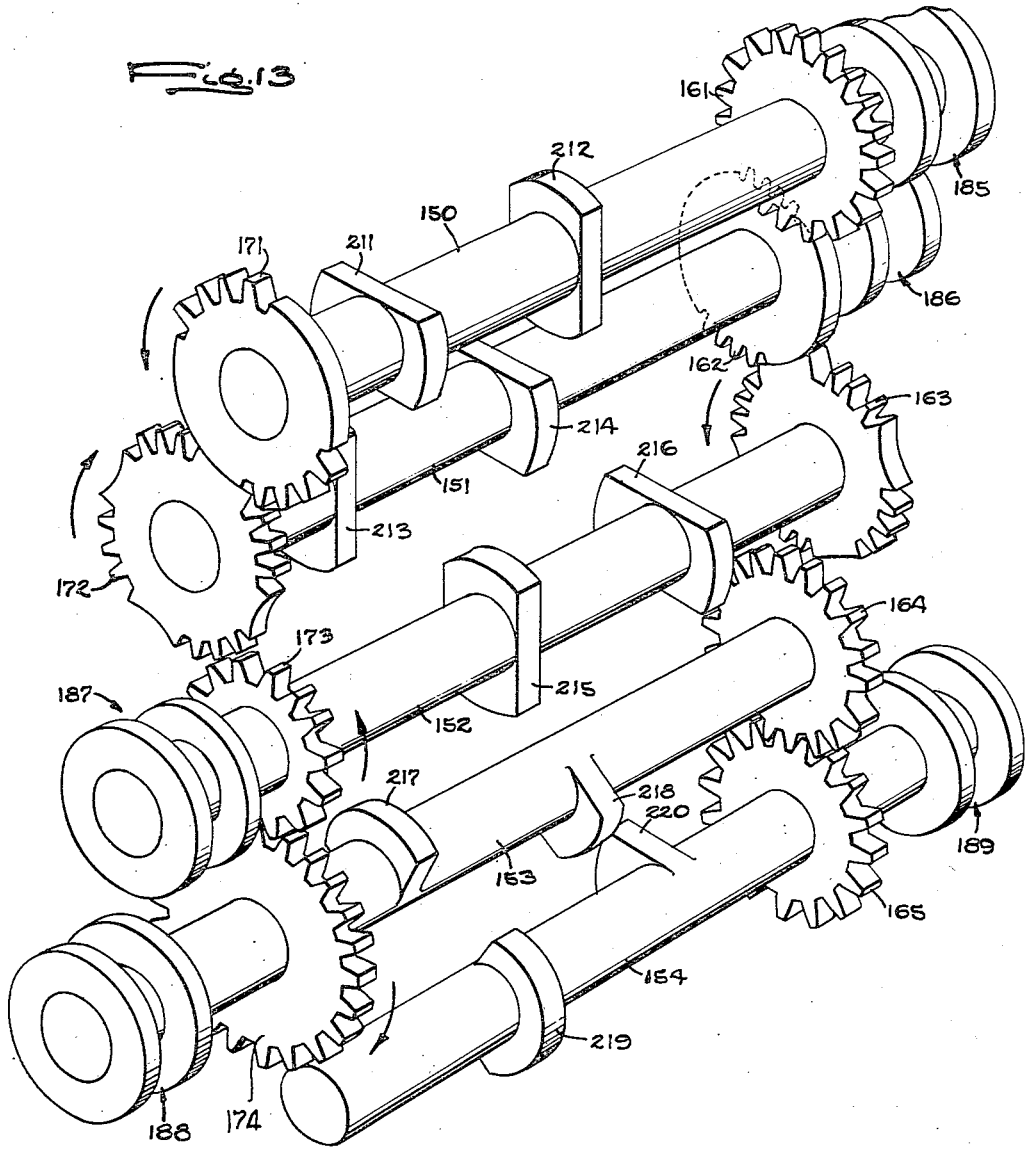

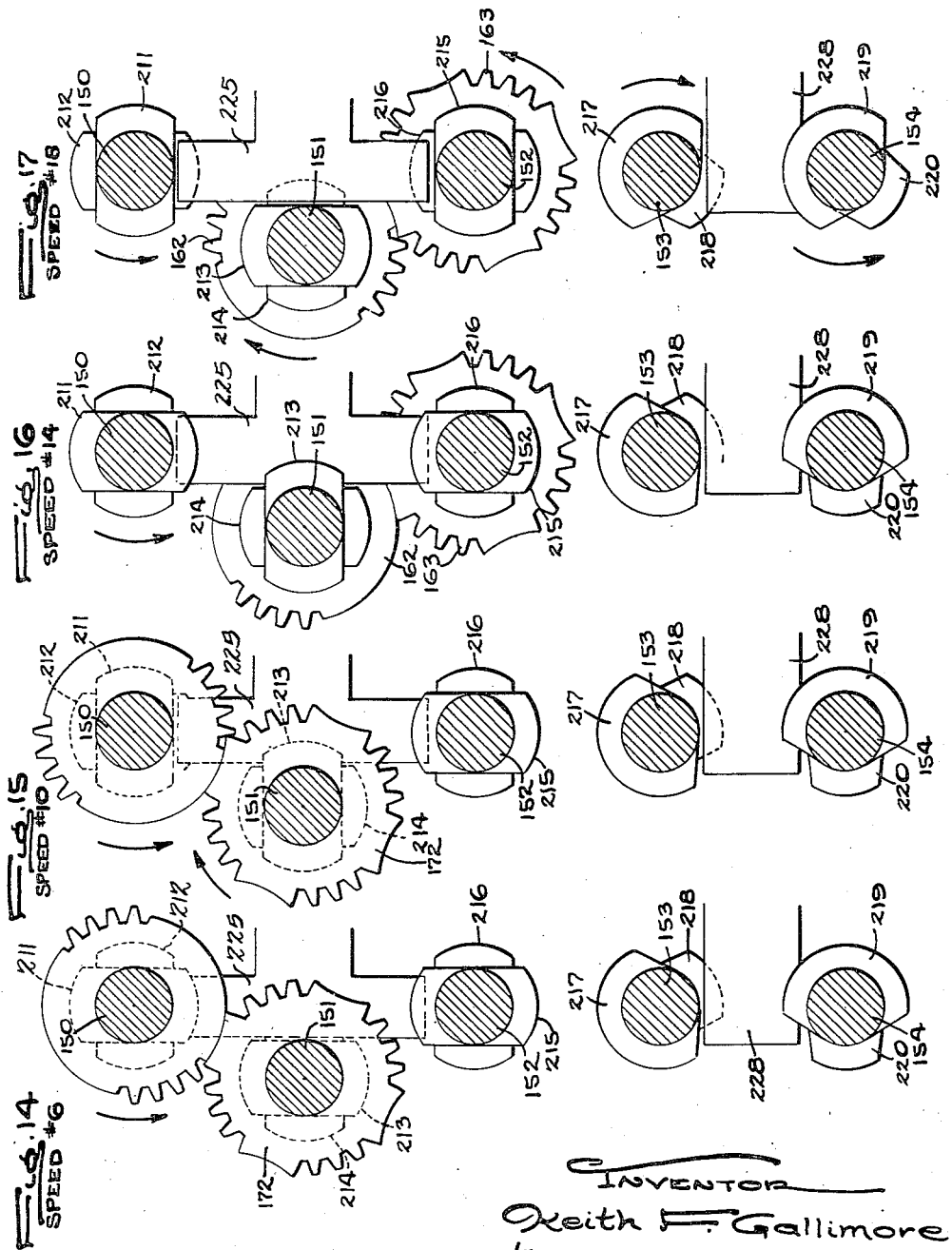

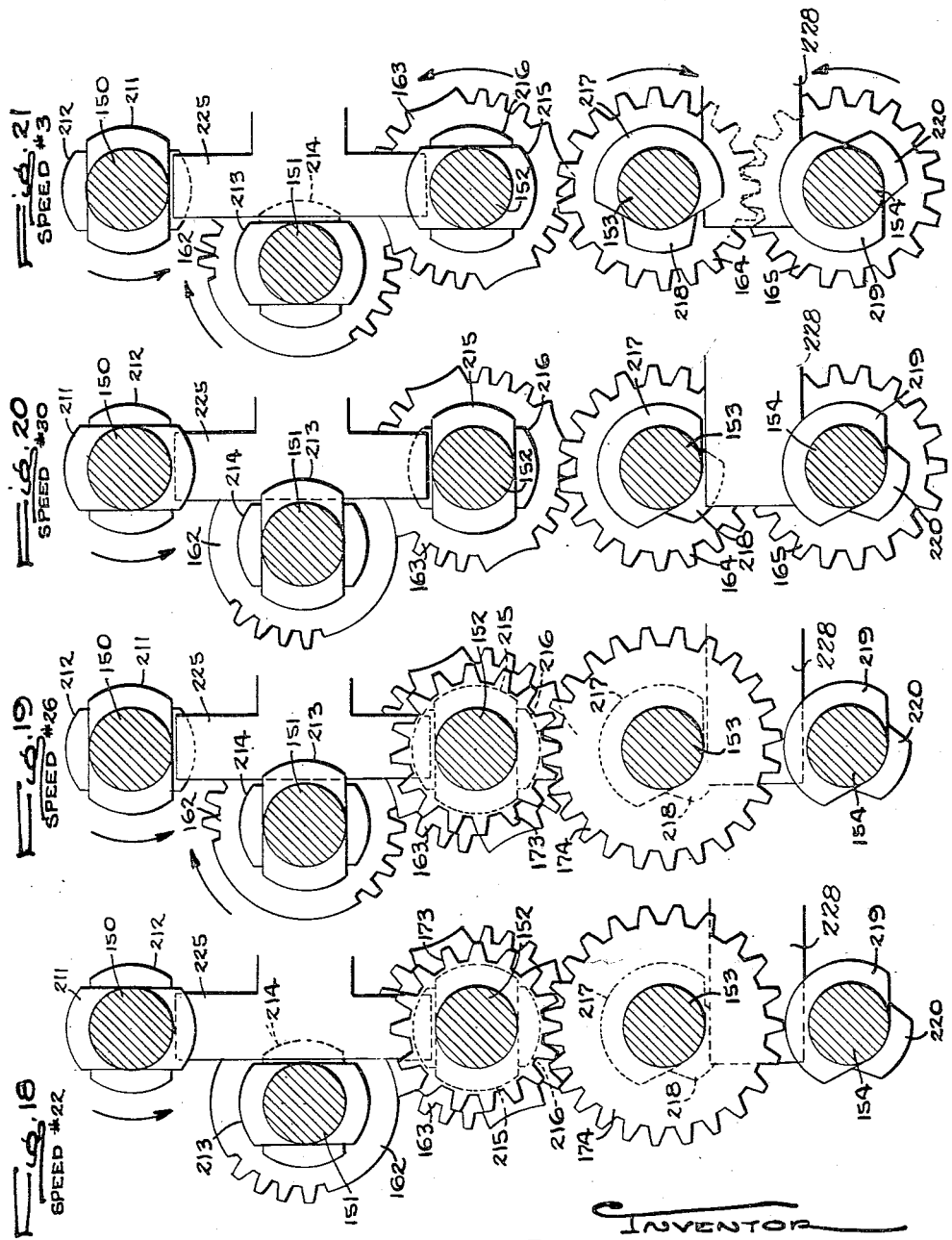

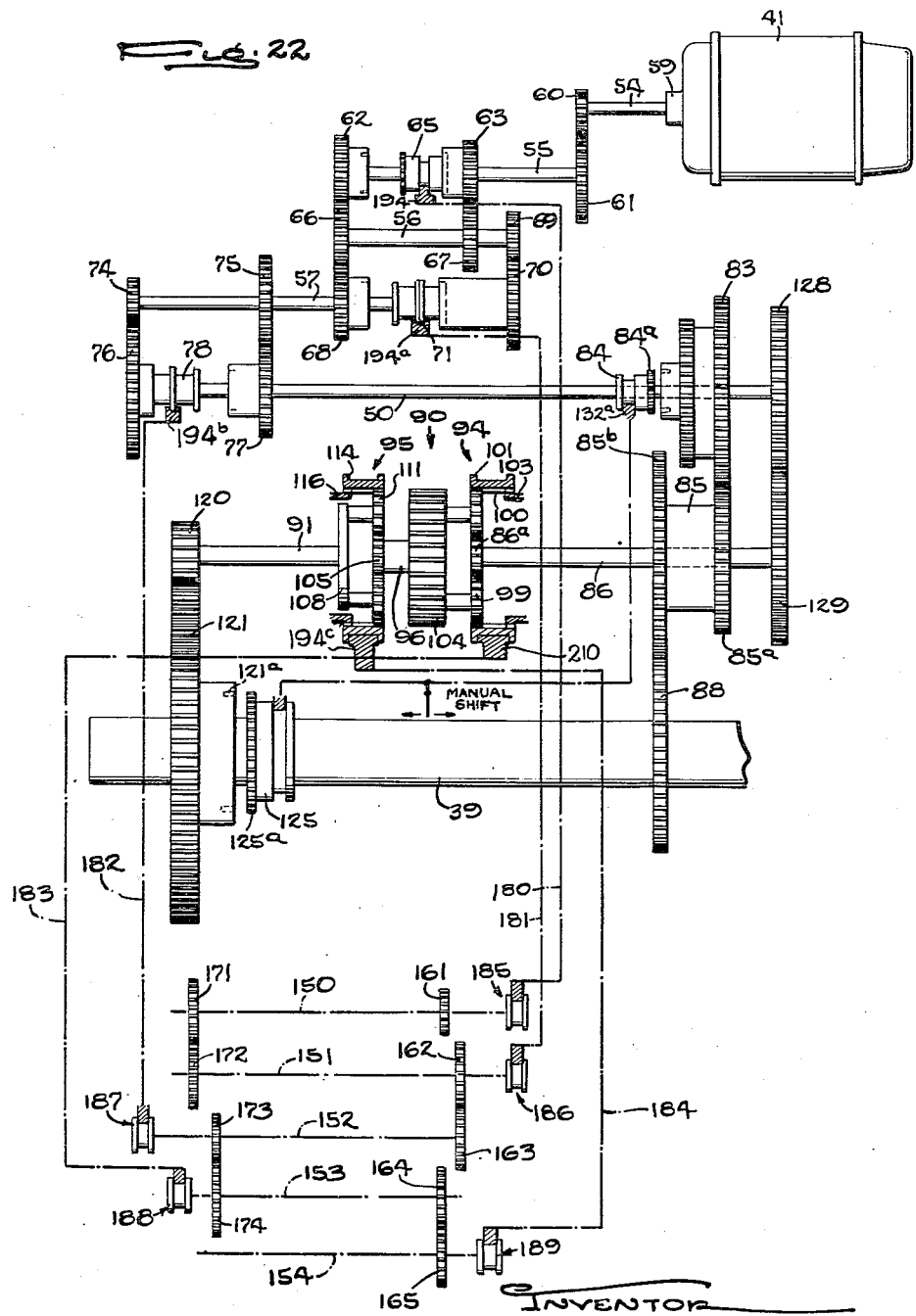

United States Patent Office 2,774,250
Patented Dec. 18, 1956

2,774,250

MULTI-SPEED TRANSMISSION FOR MACHINE TOOLS

Keith F. Gallimore, Fond du Lac, Wis., assignor to Giddings & Lewis Machine Tool Company, Fond du Lac, Wis., a corporation of Wisconsin Application July 30, 1954, Serial No. 446,833

21 Claims. (Cl. 74—364)

The present invention relates in general to machine tools. More particularly it relates to multi-speed transmissions and means for adjusting the same to drive a rotatable element at any selected one of a plurality of speeds. While not limited to any one application, the invention is of particular utility in providing a plurality of rotational speeds for the spindle of a horizontal boring, milling and drilling machine.

It is the general aim of the invention to provide an improved multi-speed transmission for a machine tool providing a wide range of speeds for the driven element together with a novel selector device for quickly setting the transmission to any one of the several speeds.

Another important object of the invention is to provide a multi-speed transmission utilizing a plurality of shiftable elements for changing its output speed, in combination with a device for simultaneously setting the shiftable elements in any predetermined one of several position patterns. In this aspect it is also an object to make possible the selection of a desired output speed while the transmission is operating at another speed, it being necessary to move but a single control instrumentality to effect shifting of the elements to their new positions while operation is briefly interrupted.

It is an additional object to provide an improved multi-speed transmission which, when powered by a constant speed prime mover, makes possible the drive of a rotatable element, such as a tool spindle, at a first plurality of different "high" speeds and at a second greater plurality of "low" speeds, and to provide means for pairing each high speed with more than one low speed so that the drive may be changed from one of the paired speeds to the other in an instant.

In connection with the foregoing objective, another object is the provision of such a multi-speed transmission having a wide range of substantially uniformly graduated output speeds, the lowest "high" speed being only slightly greater than the highest "low" speed.

Still another object of the invention is to provide a novel speed preselector device by which a desired speed is "set up" or "preselected" on an indicator dial, the subsequent actuation of a single lever or control instrumentality then causing a multi-speed transmission to be set to the desired speed.

A further object of the invention is the provision of such a preselector device operative upon actuation to place a plurality of elements, such as clutches, which are shiftable between two positions, in any desired one of their several positional patterns by shifting only those elements which are originally in disagreement with the desired pattern.

Other objects and advantages will become apparent as the following description proceeds, taken in conjunction with the accompanying drawings, in which.

Figure 1:
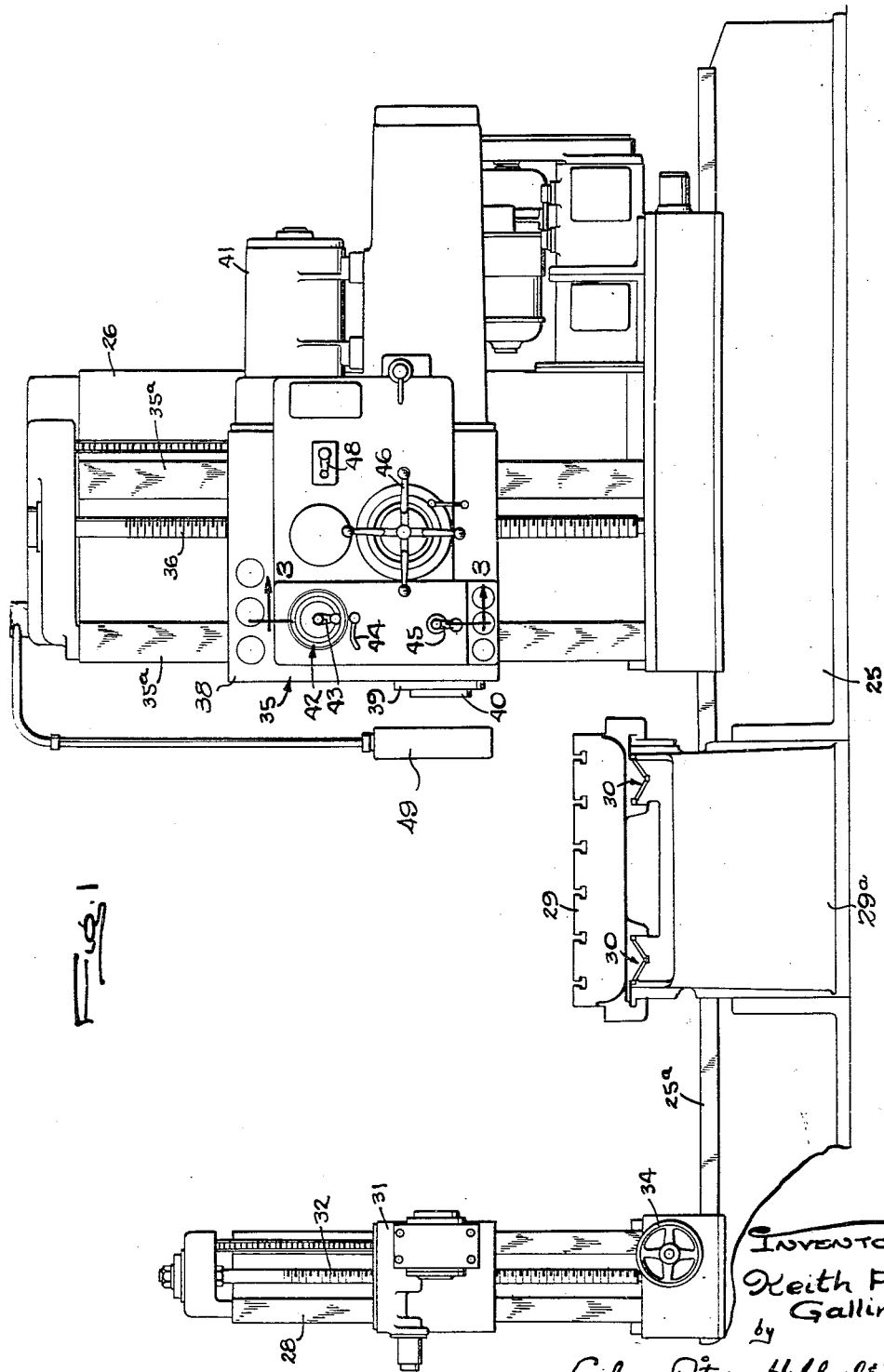
Figure 1 is a front elevation of an exemplary machine tool having a headstock equipped with a multi-speed transmission and speed preselector device embodying the features of the invention.
Figure 3:
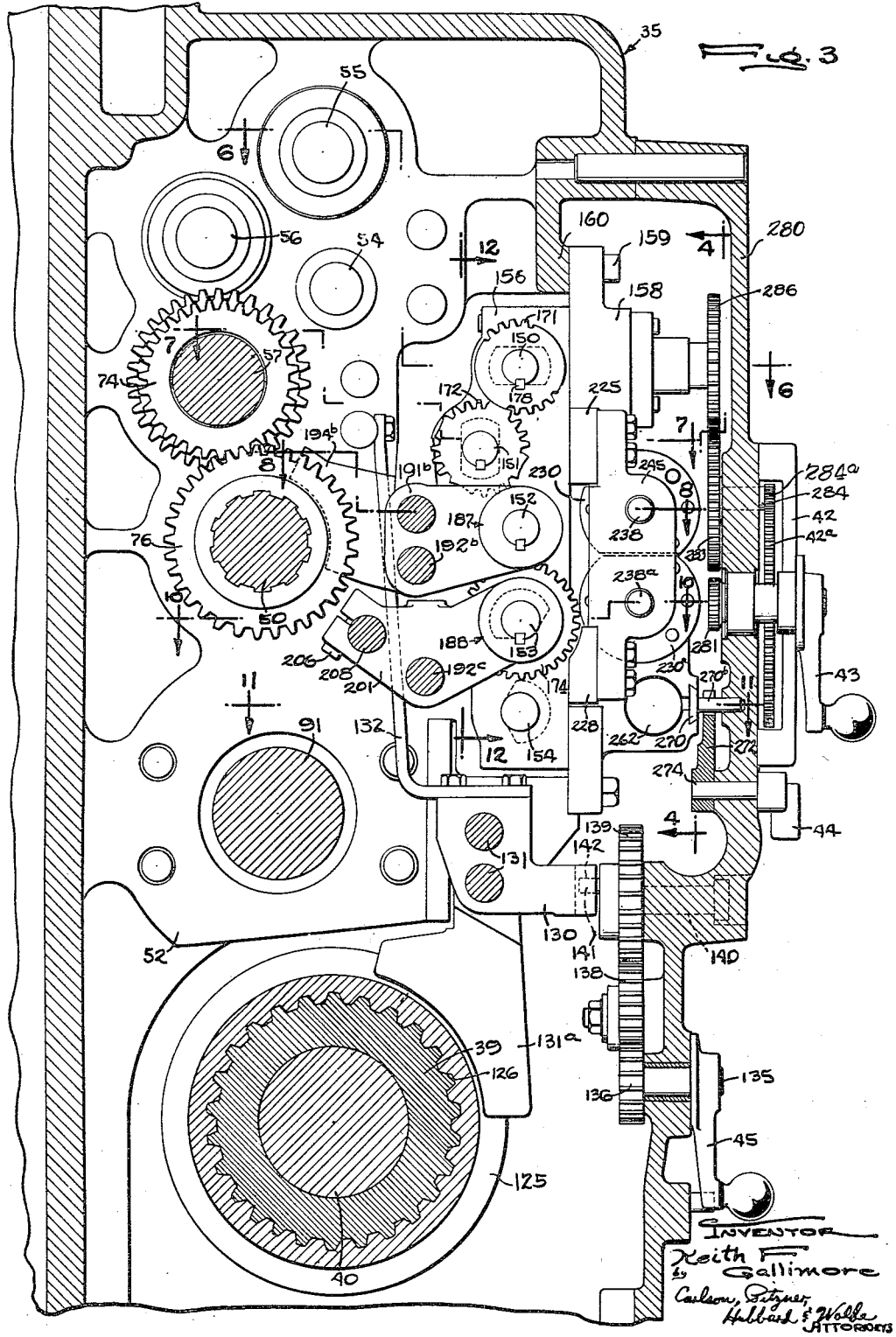
Fig. 3 is a vertical transverse section through the machine headstock, taken substantially along the line 3—3 in Fig. 1.

Figs. 6, 7, 8, 10 and 11 are fragmentary detail views, partially in horizontal section taken substantially along the lines 6—6, 7—7, 8—8, 10—10 and 11—11, respectively, in Fig. 3;

Fig. 9 is a detail view of a speed selector indicator dial which is mounted on the face of the headstock as shown in Fig. 1;

Fig. 12 is a transverse vertical section, looking forward, taken substantially along the line 12—12 in Fig. 3;

Fig. 13 is a fragmentary perspective view illustrating the relative positions of Geneva gear connections between a plurality of shifter shafts mounted in the preselector device;

Figs. 14 through 21 are diagrammatic left end views of the shifter shafts, showing the rotational positions to which they are indexed for accomplishing several shifting operations, and Fig. 22 is a diagrammatic representation of the multi-speed transmission, the shifter shafts, and the respective connections between the latter and corresponding ones of the several clutches in the transmission.

While the invention has been shown and is described in some detail with reference to a particular embodiment thereof, there is no intention that it thus be limited to such detail. On the contrary, it is intended here to cover all alternatives, modifications, equivalents and uses falling within the spirit and scope of the invention as defined by the appended claims.

Referring now to Fig. 1, the exemplary machine tool there illustrated to make clear one environment for the invention will be recognized as a horizontal boring, milling and drilling machine. Briefly, the machine comprises a base 25 formed with ways 25a which slidably support vertical main and auxiliary columns 26, 28 on either side of a work table 29. The latter is movable on a separate base 29a having ways 30 of V cross-section in a direction transverse to the ways 25a. The auxiliary column 28 carries a tailstock 31 which is vertically adjustable by means of an elevating screw 32 connected for rotation by means of a hand wheel 34. Correspondingly, the main column 26 carries a headstock 35 which is vertically adjustable along ways 35a, by means of a power driven elevating screw 36.

The illustrated headstock 35 comprises a main housing 38 which journals a rotatable sleeve 39 projecting from its left side. Concentrically disposed within the sleeve, and splined for axial movement relative to it, is a spindle 40 which is thus rotatable with the sleeve. For rotationally driving the sleeve 39, a prime mover, in this case a constant speed alternating current motor 41, is mounted on the right side of the headstock and connected to the sleeve through a multi-speed transmission which will be more fully described in connection with Fig. 2. A plurality of control instrumentalities are mounted on the face of the headstock, including a spindle speed indicator dial 42 and a control crank 43 for setting the same, as well as a shifting control lever 44 and a manual shifting lever 45. The organization and function of these instrumentalities will become apparent as the description proceeds. It may also be noted that various controls, including a pilot wheel 46 and a selector lever 48, are mounted on the face of the headstock for controlling the axial feed of the spindle 40 relative to the sleeve 39. Various other control switches and the like are carried by a pendant 49 which swings within easy reach of an operator as he moves about the machine.

A machine tool of the type illustrated in Fig. 1 is quite versatile, both with respect to the variety of machining operations it can perform and the types and sizes of workpieces that can be accommodated. The workpiece itself may be supported between the sleeve 39 and the tailstock 31 so as to be rotated relative to a stationary cutting tool mounted on the table 29. Alternatively, a large workpiece such as a casting may be mounted on the table and a fly tool, drill bit or other cutting tool carried by the spindle 40 for boring, drilling or tapping operations. Milling may likewise be carried out by mounting the workpiece on the table and traversing it past a rotating milling cutter on the spindle. In the successful performance of such diverse machining operations, the sleeve 39, with its spindle 40, must be susceptible of rotation at a great number of different speeds. For example, in the drilling tapping of castings, the former operation is desirably carried out at a high spindle speed and the latter at a low spindle speed. Both the high and low speeds, however, must be selectable from a great number of possible speeds according to the size of the hole being drilled or tapped as well as the material of the cutting tool and the workpiece, respectively. And, as a number of machining operations may be performed successively on a single workpiece, it is highly desirable that the spindle speeds be capable of change from one value to another with rapidity and by some simple style of manipulation of controls which will not confuse the operator.

It is to the accomplishment of these goals that the present invention is directed through the provision of an improved multi-speed transmission drivingly connected between the motor 41 and the sleeve 39. The operator preselects a spindle speed by setting the dial 42. Then he simply depresses the control lever 44 to effect the selected change through the intermediation of a plurality of two position speed change clutches included in the transmission and arranged to be shifted to any one of their several possible combined positions.

*The multi-speed transmission*

In accordance with the invention, the multi-speed transmission is organized so that the sleeve and spindle 39, 40 may be driven from the motor 41 at any one of a great number of speeds (in the present case, thirty-two), such speeds being grouped as a plurality of "high" speeds and a greater plurality of "low" speeds. For this purpose, there are provided two speed change gearings or gear trains, each having a plurality of speed changing clutch means, together with a fixed ratio speed reduction gearing. Provision is made to interconnect the two speed change gear trains in tandem relation between the motor and the speed reduction gearing; and means are provided to connect the driven element or sleeve 39 optionally (*a*) to the speed reduction gearing and (*b*) to the first gear train independently of the second gear train. In order to obtain a smooth graduation of the available speeds, the ratio of the speed reduction gearing is made approximately equal to the maximum speed reduction afforded by the first gear train alone.

Figure 2:
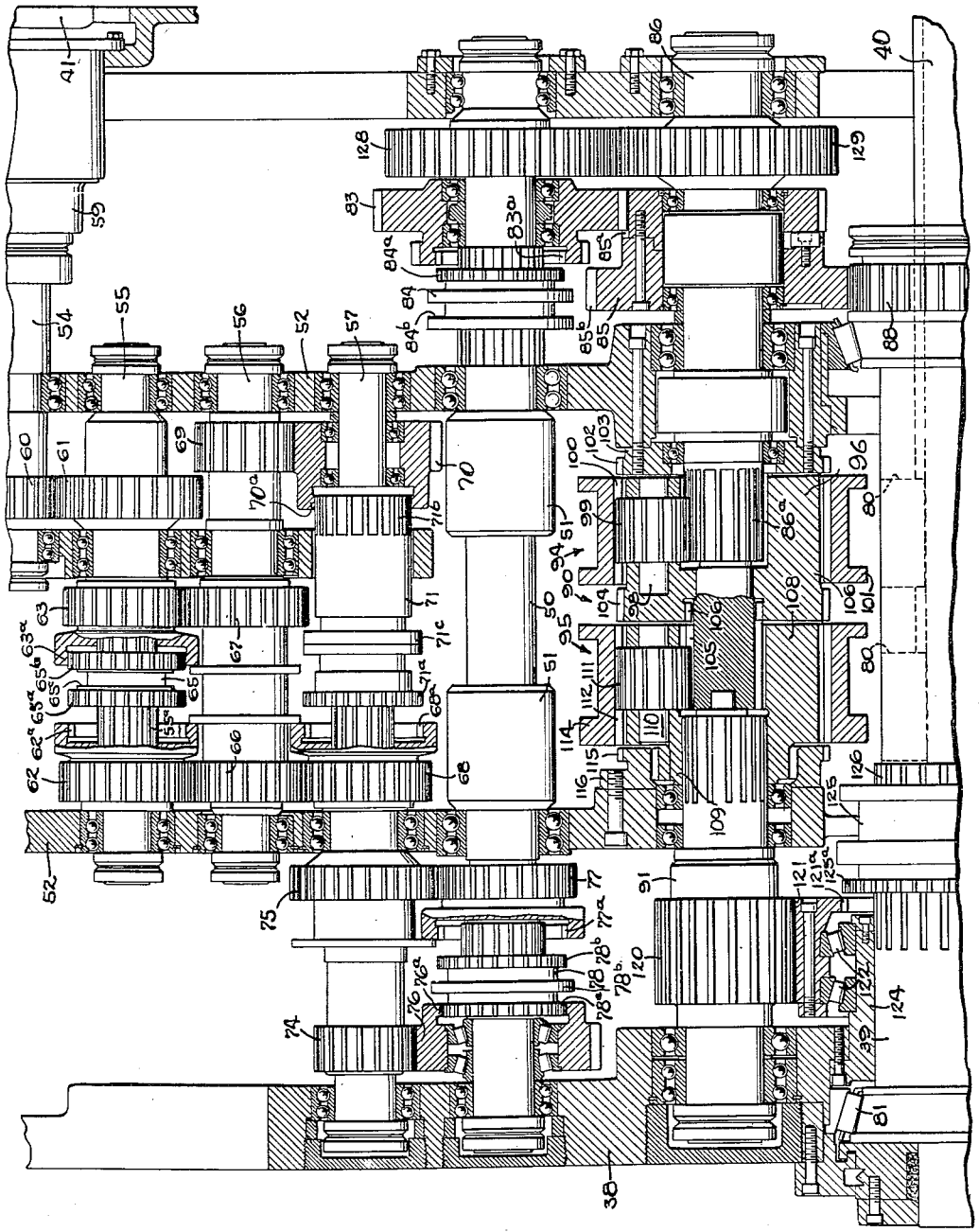
Fig. 2 is an unfolded lay-out of the multi-speed transmission, illustrating the preferred arrangement of reduction gears and shiftable clutch means.

Referring now to Fig. 2, the multi-speed transmission there illustrated as embodying certain features of the invention comprises a first layshaft 50, formed in three sections joined by splined couplings 51. The two end sections of the series are journaled by respective pairs of anti-friction ball bearings. The outboard bearing in each case is mounted in the end walls and the inboard bearing in one of the integral partitions or webs 52 of the headstock housing 38. A first speed change gearing or gear train is drivingly connected between the motor 41 and the layshaft 50. In this instance, the first gear train includes a plurality of shafts 54–57 all extending between and journaled in the headstock housing partitions 52. The first shaft 54 is coaxial with the motor 41 and connected to it by means of a suitable drive coupling 59. This shaft carries a rigidly mounted spur gear 60 meshed with a mating gear 61 fast on the second shaft 55. The second shaft 55, in turn, freely journals axially spaced gears 62, 63 each provided with integral internal clutch teeth 62a, 63a.

For coupling either of the gears 62 or 63 to be driven from the shaft 55, the latter is axially splined as at 55a to receive an internally splined shiftable couplet 65 having external gear teeth 65a, 65b selectively engageable with the respective internal teeth 62a or 63a respectively. The clutch 65 is provided with an annular groove 65c adapted to receive a suitable shifter fork as will be explained below.

The gears 62, 63 are in constant mesh with respective mating spur gears 66, 67 which are keyed to the third shaft 56. The gear 66 is also in constant mesh with a second mating spur gear 68 freely journaled, as by anti-friction needle bearings, on the fourth shaft 57. When the clutch 65 is shifted to the left, therefore, the motor drives the gear 68 through the shaft 55, and the gears 62, 66. The shaft 56 also is formed with an integral spur gear 69 at its right end which is in constant mesh with a mating gear 70 freely journaled, as by anti-friction ball bearings, on the shaft 57. A second shiftable clutch 71 is axially splined for longitudinal movement along the shaft 57, and carries integral external clutch teeth 71a, 71b engageable respectively with internal clutch teeth 68a, 70a on the gears 68 and 70. Thus, with the two clutches 65 and 71 shifted to the right as viewed in Fig. 2, drive from the motor 41 to the shaft 57 is effected through the shaft 55, gears 63, 67, shaft 56, and gears 69, 70. It will be seen that the shaft 56 has two possible speeds depending upon the position of the clutch 65, while the shaft 57 has four possible speeds depending upon the combined positions of the clutches 65 and 71.

For driving connection to the first layshaft 50, the shaft 57 has two spur gears 74, 75 fast at its left end and constantly meshed with mating spur gears 76 and 77, the latter being freely journaled on the layshaft 50 by suitable anti-friction bearings. A third clutch 78 is splined to and axially shiftable along the layshaft 50, and has external clutch teeth 78a, 78b adapted to lock with respective mating internal clutch teeth 76a, 77a on the gears 76 and 77. For shifting the clutch 78, a central annular projection 78c is adapted to receive a grooved shifter shoe (not shown in Fig. 2). Therefore, since the shaft 57 may be driven at any one of four possible speeds, depending upon the positional settings of the clutches 65 and 71, the layshaft 50 may be driven at eight possible speeds depending upon the combined setting of the clutch 78.

The spindle 40, as shown in Fig. 2, is concentrically disposed within the sleeve 39 and splined to receive keys 80 which lock it against rotation relative to the sleeve while permitting relative axial movement. The sleeve, in turn, is journaled in the headstock housing, only one anti-friction bearing 81 being visible in Fig. 2.

Means are provided for driving the sleeve 39 and spindle 40 from the first speed change gear train, i. e. from the layshaft 50. As here shown, such means take the form of speed step-up gearing comprising a spur gear 83 freely journaled on the layshaft and provided with internal clutch teeth 83a adapted to lock with mating external clutch teeth 84a formed integrally on a clutch ring 84. That ring is splined for relative axial movement on the shaft 50. The clutch ring 84 has an annular groove 84b for receiving a shifter fork, as will be more fully described. With the clutch 84 shifted to the right to drive the gear 83 with the layshaft 50, the latter gear in turn drives a gear couplet 85 freely journaled on an input shaft 86 for the second gear train, which is to be described. The couplet 85 has right gear teeth 85a which are in constant mesh with the gear 83, and left gear teeth 85b meshed with a high speed drive gear 88 fast on the sleeve 39. It will be seen, therefore, that with the clutch ring 84 shifted to the right, the sleeve 39 and spindle 40 are driven through the first speed change gear train and the gear 88 at any one of eight possible speeds depending upon the combined positions of the clutches 65, 71, and 78.

The second speed change gearing or gear train includes the shaft 86 as its input member and which has on its left end an integral sun gear 86a forming part of a double planetary speed reduction transmission 90. For a detailed understanding of the organization and operation of the planetary transmission 90, reference may be had to the copending application of John C. Hollis, Serial No. 397,410, filed December 10, 1953, wherein such a transmission is described and claimed. The transmission 90 is operatively connected to a second layshaft 91 and, depending upon the settings of shiftable clutch elements in the transmission, is operative to drive the layshaft 91 at three possible speeds for each speed of the input shaft 86.

Without describing the construction of the planetary transmission 90 in detail, it will be sufficient to note that it consists of two tandemly connected planetary gear sets 94 and 95. The former includes an annular planet carrier 96 supporting a plurality of circularly spaced studs 98 journaling, as by anti-friction needle bearings, a corresponding plurality of planet gears 99 (see also Fig. 5). The planet gears are concentrically disposed around and meshed with a sun gear 86a integral with the shaft 86, while they are also meshed with internal teeth 100 formed on a concentrically surrounding reaction ring 101. The internal teeth 100 are considerably greater in axial length than the planet gears 99, so that reaction member 101 may be shifted axially into locking engagement either with external clutch teeth 102 formed on a stationary ring 103 bolted to the adjacent partition 52, or with external clutch teeth 104 formed on the external surface at the right end of the planet carrier 96. When the reaction member 101 is shifted to the right (thus held stationary), the planetary gear set 94 provides a predetermined speed reduction ratio between the shaft 86 and the carrier 96.

The second planetary gear set 95 is substantially identical with the first, its sun gear 105 being drivingly splined as at 106 to the planet carrier 96. Further, its planet carrier 108 is rigidly splined as at 109 to the second layshaft 91. A plurality of studs 110 journal a corresponding plurality of planet gears 111 which are constantly meshed with the sun gear 105 and with internal teeth 112 of a reaction member 114. The latter is axially shiftable into locking engagement either with external clutch teeth 115 formed on a ring 116 bolted fast to the adjacent partition 52, or with the teeth 104 on the planet carrier 96. With the reaction member 114 locked to the clutch teeth 115, the planetary gear set 95 provides a predetermined speed reduction ratio between the sun gear 105 and the output shaft 91. On the other hand, with the reaction member 114 shifted into engagement with the clutch teeth 104, a direct drive is provided between the planet carrier 96 and the output shaft 91.

It will thus be apparent, in summary, that with the reaction members 101 and 114 shifted to their respective right and left positions to be held stationary by the respective clutch teeth 102, 116, a double speed reduction is provided between the shaft 86 and the shaft 91. When both the reaction members 101 and 114 are shifted to the left, the planetary gear set 94 provides no speed reduction, while the planetary gear set 95 provides a single predetermined speed reduction ratio. Still further, if both of the reaction members 101 and 114 are shifted inwardly, i. e., to their respective left and right positions, a direct drive is established between the input shaft 86 and the output layshaft 91.

For driving the sleeve 39 from the second layshaft 91, a fixed ratio speed reduction gearing is provided. For this purpose the layshaft 91 is formed with an integral spur pinion 120 of relatively great axial length to accommodate the high torque involved. The pinion 120 is constantly meshed with a relatively large diameter bull gear 121 freely journaled by anti-friction bearings 122 on a cylindrical member 124. The latter is rigidly bolted in inwardly extending relation to the headstock housing and concentrically spaced from the sleeve 39. This substantially eliminates transverse loading on the sleeve which might otherwise arise as a result of gear reaction of the bull gear journaled directly on the sleeve. The bull gear also has internal clutch teeth 121a adapted to lock with external clutch teeth 125a on a shiftable clutch 125 splined as at 126 to the sleeve 39.

For driving the second speed change gear train from the first speed change gear train (thus connecting them in tandem relation with the motor 41), the layshaft 50 carries at its right end a keyed spur gear 128 meshed with a mating gear 129 fast on the input shaft 86. The two clutches 84 and 125, arranged to be complementally shifted in unison, therefore constitute means for connecting the sleeve and spindle 39, 40 for drive optionally (a) through the speed reduction gears 120, 121 and the first and second speed change gear trains in tandem, and (b) through the first speed change gear train independently of the second speed change gear train. Thus, whenever the clutch 84 is engaged and the clutch 125 is disengaged, the sleeve is driven from the first gear train alone through the couplet 85 and the high speed gear 88. Conversely, whenever the clutch 84 is disengaged and the clutch 125 is engaged, the sleeve 39 is driven through the first gear train, the second gear train, and the bull gear 121 at a somewhat lower speed, depending upon the setting of the planetary transmission 90. In order to assure that the clutches 84 and 125 are not simultaneously engaged, means are provided for complementally shifting them in unison, i. e., shifting both to the left or to the right at the same time, as will be more fully described.

The multi-speed transmission as described is particularly advantageous in that it provides thirty-two smoothly graduated spindle speeds from the constant speed driving element or motor 41. Assuming, for example, that the motor speed is 1750 R. P. M. and the speed of the first shaft 55 is constant at 900 R. P. M., the spindle may be driven at speeds ranging between 5.5 R. P. M. and 1200 R. P. M. Now, since the diameter of the spindle 40 and the concentric sleeve 39 are fixed by the maximum load which they are to accommodate, and since they are normally relatively large in diameter, the bull gear 121 in surrounding sleeve 39 must also be relatively large in diameter. In the interest of saving space, which is at a premium within the headstock housing, the pinion 120 must be relatively smaller in diameter and it therefore provides a fixed ratio speed reduction when it drives the bull gear 121.

Notwithstanding this imposed requirement, the present multi-speed transmission makes it possible for the highest "low" speed (obtained by the second speed change gearing and the speed reduction gearing 120, 121) to be substantially equal to or preferably only slightly less than the lowest "high" speed (obtained by the first speed change gearing and the step-up gears 83—85a, 85b—88).

For this purpose the ratio of the speed reduction gears 120, 121 is made substantially equal to the maximum speed reduction ratio afforded by the first speed change gear train. To illustrate by a specific example, if the maximum speed of the layshaft 50 is 900 R. P. M., the speed step-up provided by the gears 83—85a, 85b—88 when the clutch 84 is engaged may drive the spindle at 1200 R. P. M.—the highest "high" speed. If the minimum speed of the layshaft 50 is 264 R. P. M. (a maximum reduction ratio of 3.4:1 for the first speed change gear train), the lowest "high" speed of the spindle will be 350 R. P. M. Now the highest "low" speed is obtained when the first and second speed change gearings are set to provide their smallest speed reduction ratios (in the present instance 1:1). When this occurs, speed reduction for the spindle is caused principally by the reduction gears 120, 121. Therefore, by choosing the reduction ratio of the latter gears to be 3:1 (approximately equal to the maximum reduction ratio of 3.4:1 for the first speed change gearing), the highest "low" spindle speed is made 300 R. P. M.—which is slightly less than the lowest "high" speed of 350 R. P. M. Smooth graduation of the possible spindle speeds is thus obtained between the "high" and "low" ranges.

Operation of the multi-speed transmission

To review briefly the operation of the multi-speed transmission, it will be understood that the sleeve 39 is operable at any one of eight possible speeds when driven through the high speed gear 88 with the clutch 84 engaged. On the other hand, when the clutch 84 is disengaged, and the clutch 126 engaged, the first layshaft 50 may, nevertheless, have any one of eight possible speeds depending upon the settings of the three clutches 65, 71, and 78. Thus, the input shaft 86 for the second gear train may have eight possible speeds and since the reaction members 101 and 114 serve as two additional shiftable clutches affording three possible speed reductions in the planetary transmission 90, the second layshaft 91, the bull gear 121, and the sleeve 39 may thus be driven at a total of twenty-four possible low speeds. These possible positional patterns of the clutches involved are listed in the following table, the letters "R" and "L" indicating whether each of the clutches is shifted to its left or right position. It will be understood that when operating at "high" speeds, the positional settings of the planetary clutch members 101 and 114 are of no consequence, since the clutch 125 is disengaged.

| Speed No. | Clutch Positions | | | | | | Spindle, R. P. M. | |
|---|---|---|---|---|---|---|---|---|
| | 65 | 71 | 78 | 101 | 114 | 84 and 125 | | |
| 1 | R | R | L | --- | --- | R | 350 | High₁ |
| 2 | R | R | L | R | L | L | 5.5 | Low₁-a |
| 3 | R | R | L | L | L | L | 22 | Low₁-b |
| 4 | R | R | L | L | R | L | 88 | Low₁-c |
| 5 | L | R | L | --- | --- | R | 420 | High₂ |
| 6 | L | R | L | R | L | L | 6.5 | Low₂-a |
| 7 | L | R | L | L | L | L | 26 | Low₂-b |
| 8 | L | R | L | L | R | L | 105 | Low₂-c |
| 9 | R | L | L | --- | --- | R | 500 | High₃ |
| 10 | R | L | L | R | L | L | 8 | Low₃-a |
| 11 | R | L | L | L | L | L | 31 | Low₃-b |
| 12 | R | L | L | L | R | L | 125 | Low₃-c |
| 13 | L | L | L | --- | --- | R | 600 | High₄ |
| 14 | L | L | L | R | L | L | 9 | Low₄-a |
| 15 | L | L | L | L | L | L | 37 | Low₄-b |
| 16 | L | L | L | L | R | L | 150 | Low₄-c |
| 17 | R | R | R | --- | --- | R | 705 | High₅ |
| 18 | R | R | R | R | L | L | 11 | Low₅-a |
| 19 | R | R | R | L | L | L | 44 | Low₅-b |
| 20 | R | R | R | L | R | L | 175 | Low₅-c |
| 21 | L | R | R | --- | --- | R | 835 | High₆ |
| 22 | L | R | R | R | L | L | 13 | Low₆-a |
| 23 | L | R | R | L | L | L | 52 | Low₆-b |
| 24 | L | R | R | L | R | L | 210 | Low₆-c |
| 25 | R | L | R | --- | --- | R | 1,000 | High₇ |
| 26 | R | L | R | R | L | L | 16 | Low₇-a |
| 27 | R | L | R | L | L | L | 63 | Low₇-b |
| 28 | R | L | R | L | R | L | 250 | Low₇-c |
| 29 | L | L | R | --- | --- | R | 1,200 | High₈ |
| 30 | L | L | R | R | L | L | 19 | Low₈-a |
| 31 | L | L | R | L | L | L | 75 | Low₈-b |
| 32 | L | L | R | L | R | L | 300 | Low₈-c |

It will be noted that the 1st, 5th, 9th, 13th, 17th, 21st, 25th and 29th speeds are the "high" speeds afforded by the gear 88 when the clutch 84 is engaged and the clutch 125 disengaged. For each combined setting of the three clutches 65, 71 and 78, three "low" speeds are possible with the clutches 84 and 126 shifted to the left, depending upon the combined settings of the shiftable reaction members 101 and 114. The numerical values for revolutions per minute of the sleeve 39 and the spindle 40 indicated in the preceding chart are, of course, merely exemplary for one particular machine and they may be varied, as desired, by changing the relative diameters of the several gears employed in the transmission.

Manual shifting between the high and low speeds

In order to manually shift in unison the high and low speed clutches 84 and 125 so that one is engaged when the other is disengaged, a mechanical connection from the control lever 45 on the face of the headstock is provided. In this instance, such shifting connection includes a yoke 130 (Fig. 3) slidably mounted on a pair of rods 131 extending parallel to the sleeve 39 and the shaft 50. The yoke 130 carries a depending shifter fork 131a which is engaged with the clutch 125, permitting free rotation of the latter while controlling its axial position. Correspondingly, the yoke 130 has bolted to its top surface an upwardly extending arm 132 which is rigidly connected to a second shifter fork 132a (Fig. 5) engaged with the clutch 84. For moving the yoke 130 axially along the rods 131, the control lever 45 is mounted fast on a stub shaft 135 journaled in the front wall of the headstock. The shaft carries an integral spur gear 136 on its inner end, the latter being meshed with an idler gear 138 in turn driving a spur gear 139 fast on a shaft 140. At the inner end of the shaft 140 there is an eccentric pin 141 received within a vertical slot 142 defined in a forwardly projecting portion of the yoke 130. Rotation of the handle 45, and consequent rotation of the shaft 140 through the gears 136, 138, 139 results in horizontal reciprocating movement for the yoke 130 and the controlled clutches 84 and 125. By appropriate positioning of the lever 45, therefore, the multi-speed transmission may be set up to provide operation at a selected high speed or at any one of three low speeds paired with it, as determined by the positional settings of the remaining clutches.

The speed preselector and clutch shifting device

It will be manifest that in order to select any one of the eight "high" speeds indicated in the table above, it is necessary to make sure that each of the clutches 65, 71 and 78 is shifted to the proper one of its left and right positions. Further, to select a desired "low" speed to be obtained when the clutches 84 and 125 are shifted in unison to their left positions, it is necessary to make certain that the reaction members 101 and 114 are shifted to the left or right as indicated in the table. If an operator were called upon to check the table each time and then shift certain ones of these five clutches whenever he wanted a different spindle speed, a great deal of his time would be consumed and his attention distracted from other control duties. Moreover, it would be all too easy for the operator to make a mistake and set the transmission at a spindle speed radically different from that desired. An expensive workpiece or tool could thus be ruined. But even more prohibitive of a manual shifting system is the fact that the machine would have to be completely stopped before the operator could begin to shift any of the clutches. Complete shutdown for appreciable periods of time while all the clutches were checked, and in some cases repositioned, between successive machining operations would be grossly inefficient.

In accordance with the invention, novel means are provided for simultaneously shifting the clutch means 65, 71, 78, 101 and 114 into any predetermined one of their several positional patterns in order to set the transmission for operation at any one of the eight "high" speeds and at any one of the three "low" speeds paired with the selected high speed. Still more important, however, the invention provides such an arrangement in which the desired clutch positions and spindle speed may be preselected by setting a single indicator dial while the machine is in operation. As soon as the machine is stopped, all clutches which need to be moved are simultaneously shifted by power means. Machining operation at the newly selected spindle speed may immediately be resumed.

In the preferred form of the invention, the speed selector device comprises a plurality of shifter shafts 150 through 154 (Fig. 12) all mounted in parallel spaced relation with freedom for both rotational and axial movement. Means are provided for rotatably indexing the several shifted shafts according to any one of a plurality of predetermined patterns and for subsequently shifting each shaft axially to the right or left or leaving it stationary, as the case may require, depending upon its rotational position. Such shifting may be carried out in response to the energization of a single actuator. Connection is made between each of the shifter shafts 150–154 and the corresponding clutches 65, 71, 78, 101 and 114, respectively, in a manner such that each clutch follows the axial position of its shifter shaft, yet such that the latter may be rotatably indexed at any time.

In the arrangement here illustrated, the shifter shafts 150–154 are all mounted in a mutually parallel relation in a pair of spaced support panels 156, 157 (Fig. 12) which are joined to a base plate 158 and which is fastened, as by bolts 159 (Fig. 3), to a flange 160 bordering an opening in the front face of the headstock housing. For accomplishing such mounting and at the same time providing means for rotatably indexing the shifter shafts, integral sleeves on a plurality of gears are journaled in a plurality of vertically spaced openings in the panels 156 and 157.

Referring to Figs. 3, 5, 12 and 13 (recalling that Fig. 12 is a rear view) the right panel 157 journals in descending order an input spur gear 161; a pair of meshed intermittent or Geneva type gears 162, 163; and a pair of meshed spur gears 164, 165. Correspondingly, the left panel 156 journals, in descending order, a pair of meshed intermittent gears 171, 172, and a pair of meshed spur gears 173, 174. Beneath the latter gear, the panel 156 journals a plain sleeve 175. All of these gears are secured in place as shown, for example, in Fig. 11 where the face of the gear 165 bears against the panel 157 and a snap ring 176 on the opposite end of the gear sleeve bears against the opposite side of the panel to prevent axial movement. The gears 161, 171 support the first shifter shaft 150 (Fig. 12) concentrically surrounding the same and being rotationally locked thereto by axial keys 178 (Fig. 3). The key receiving slot in the shifter shaft 150 is made of relatively great axial length so that the shaft rotates in unison with the gears 161, 171 but has freedom to be shifted axially within the gears. In a similar manner, the second shifter shaft 151 is received in the gears 162, 172; the third shifter shaft 152 in the gears 163, 173; the fourth shifter shaft in the gears 164, 174; and the fifth shifter shaft in the gear 165 and the sleeve 175.

Provision is made for coupling each of the shifter shafts upon axial movement to correspondingly shift one of the clutches, while nevertheless permitting rotation of the shifter shafts without in any manner affecting the clutch positions. As shown diagrammatically in Fig. 22, shifter shaft 150 is connected by coupling means 180 to axially position the clutch 65; and the shifter shafts 151, 152, 153 and 154 are similarly provided with coupling means 181, 182, 183 and 184 respectively connecting them with the clutches 71, 78, 101 and 114. Movement of each shifter shaft to the left or right correspondingly shifts its clutch to the left or right position. Essentially, the shifter shafts reside in one of two axial positions, as do their clutches.

For mechanically embodying the several coupling means 180–184 illustrated diagrammatically in Fig. 22, the shifter shafts 150–154 carry what may be termed "spools" 185–189, respectively. The spools 187 and 188 are pinned fast on the left ends of the shafts 152 and 153, while the spools 185, 186, and 190 are pinned fast on the right ends of the respective shifter shafts 150, 151, and 154 (Fig. 13). Referring to Fig. 6, the spool 185 embraces, with freedom for relative rotational but not axial movement, an arcuate fork 190 integral with a slide 191 supported by stationary rods 192. The slide extends upwardly (Fig. 5) to present a shifter fork 194 engaged, with freedom for relative rotational but not axial movement, in the slot 65c of the clutch 65. To yieldably retain the clutch 65, the slide 191, and the shifter shaft 150 in either of their two axial positions, a spring biased detent 195 is carried by the slide and adapted to engage alternatively with spaced annular grooves 197, 198 formed in the rod 192.

Figure 5:
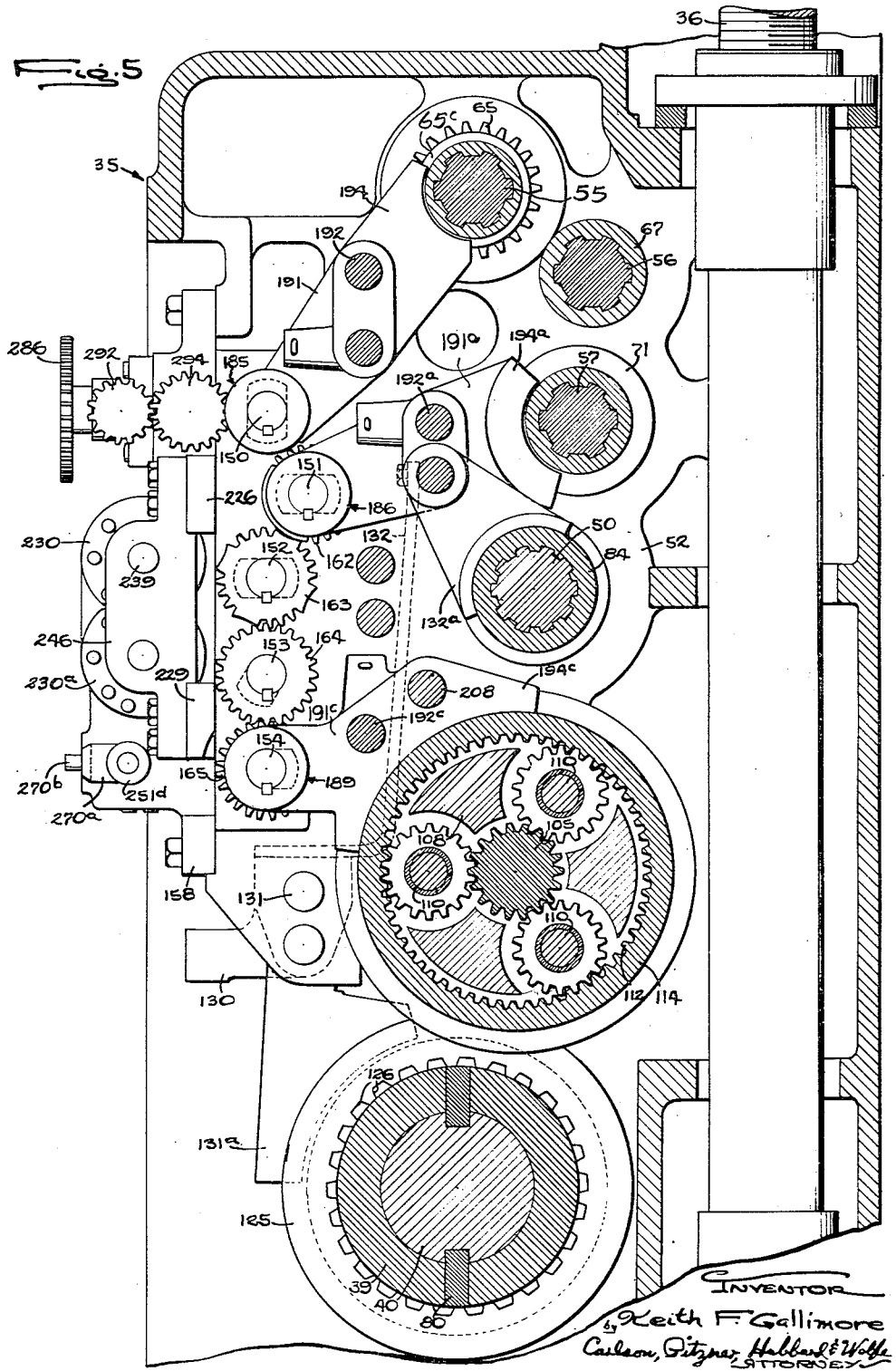
Fig. 5 is a vertical transverse section through the right end of the headstock taken substantially along the line 5—5 in Fig. 4.

Upon reference to Figs. 5 and 7 it will be seen that a similar coupling is provided between spool 186 on the shifter shaft 151 and the clutch 71 on the shaft 57. Since the organization is substantially the same as that shown in Fig. 6, the several components, i. e., forks, slide detent, etc., are identified in Fig. 7 by the same reference characters, but with the distinguishing suffix "a" added. The same identifying numbers are also employed in Figs. 3 and 8, with the distinguishing suffix "b" added, to illustrate the coupling means 182 between the spool 187 on the shifter shaft 152 and the clutch 78 on the layshaft 50. Still further, in Fig. 11, the coupling between the spool 189 on the shifter shaft 154 and the clutch reaction member 114 for the second planetary gear set 95 is similar in construction and identified with like reference characters to which the distinguishing suffix "c" has been added. It will be observed that the shifter fork 194c fits into an annular groove in the outer surface of the reaction member 114 which is defined by upstanding end flanges on the latter.

Figure 11:
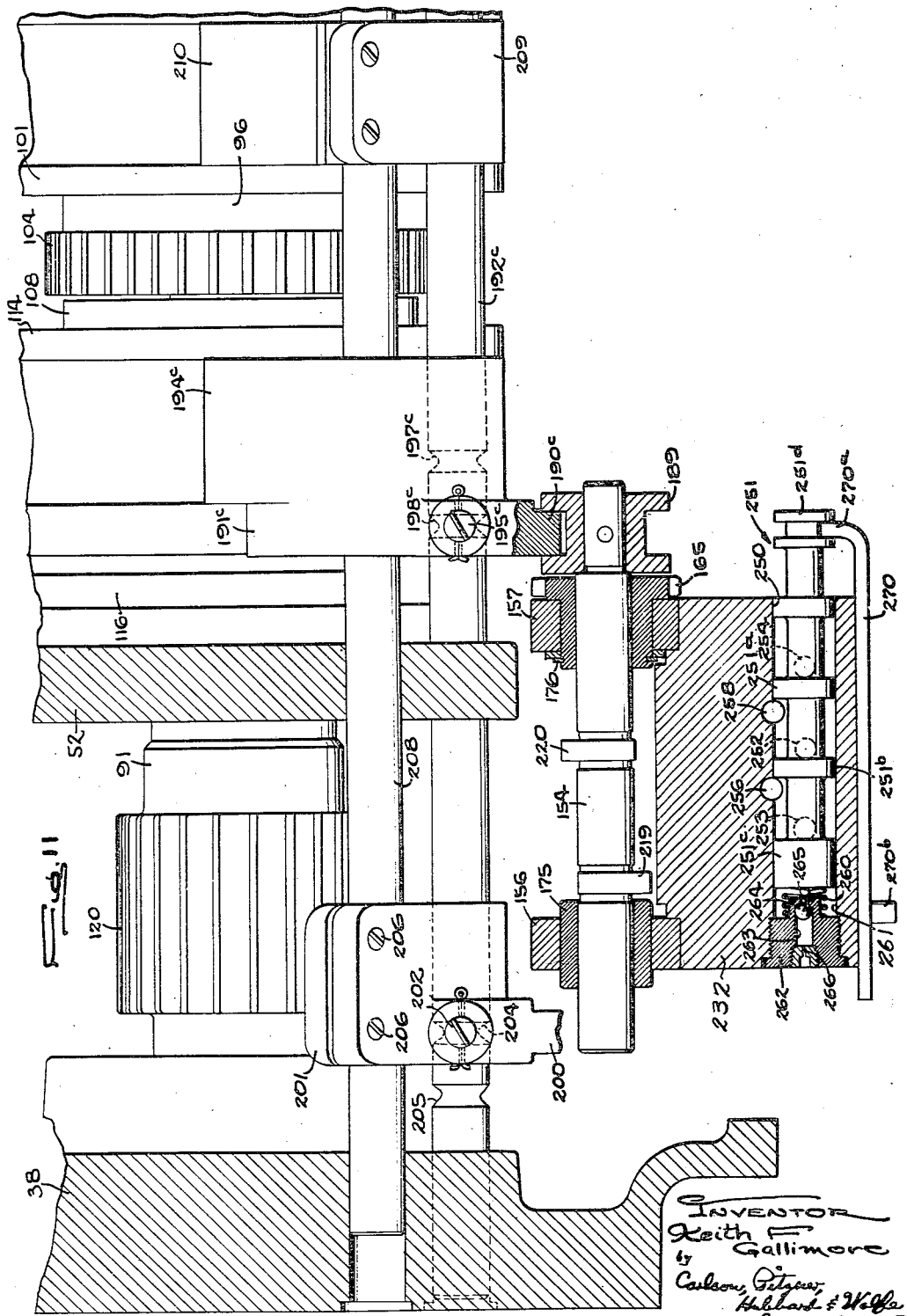

With reference to Figs. 10 and 11 it will be seen that the coupling 183 between the shifter shaft 153 and the shiftable reaction member 101 for the first planetary gear set 94 is modified somewhat owing to the longitudinal displacement of these two parts as seen best in Fig. 10. The spool 188 on the shifter shaft 153 receives a shifter fork 200 formed integrally with a slide 201 movable axially along the stationary rod 192c. The slide 201 is yieldably retained in either of two positions by a spring biased detent 202 engageable with grooves 204, 205 formed in the stationary rod. The slide 201 is clamped fast as by screws 206 to an axially slidable shifting rod 208 which extends in parallelism with the shifter shafts and carries fast at its left end a shifter shoe 209. The latter is slidable on the stationary rod 192c and has a fork portion 210 engaged in the annular groove formed on the outer surface of the reaction member 101.

In order to afford axial translation of the several shafts 150–154 in response to energization of an actuator (to be described), and only when the shafts are in certain predetermined rotational positions, each is provided at its midportion with a pair of axially and circumferentially spaced radial projections. The projections are segmental in form, that is, none extends completely around its shaft. The two projections of each pair subtend mutually exclusive arcs concentric with their shafts. As shown best in Fig. 13, the first three shifter shafts 150–152 all have axially spaced projections 211, 212; 213, 214; and 215, 216, respectively, which are identical in shape. It will be noted that each of these projections is in the form of a bar substantially equal in width to the diameter of the respective shifter shafts and extending diametrically across the shafts to present radially projecting lobes, spaced at 180° around the shaft. Taking the projections on the shifter shaft 150 as an example, the projections 211 and 212 are phased at right angles, so that each of the four lobes subtends an exclusive arc of approximately 90° around the shaft 150.

The axially spaced paired projections 217, 218 and 219, 220 on the respective shifter shafts 153 and 154 are spaced apart an axial distance corresponding to the spacing of the projections on the shafts 150–152. However, the left projections 217 and 219 on the shafts 153 and 154 are made somewhat greater in circular extent subtending an arc slightly less than 180°. By contrast, the projections 218 and 220 are formed to extend from one side of their respective shifter shafts 153 and 154, being phased oppositely with respect to their paired projections 217 and 219 and subtending an arc of approximately 90° around their shafts.

The several paired projections on the shifter shafts 150—154 cooperate with actuators reciprocal longitudinally on one side of each shaft in order to impart simultaneous axial shifting to those shafts having predetermined rotational positions. To this end, a pair of actuator members 225, 226 (Fig. 12) are disposed axially intermediate the several pairs of projections on the shifter shafts 150–152, and a corresponding pair of actuator members 228, 229 are similarly disposed axially between the paired projections 217, 218 and 219, 220 on the lower shifter shafts 153 and 154. For operational purposes, the two pairs of actuator members may be considered as but a single pair, since they are mounted for movement in unison.

With reference to Figs. 7 and 14, it will be apparent that the actuator members 225, 226 are disposed in side-by-side relation and shaped generally in the form of a T turned on its side. The members 225, 226 thus present edges disposed adjacent the lower, right and top sides respectively of the shifter shafts 150, 151, and 152, overlapping those projections on the shifter shafts which extend toward the actuators. Similarly, the actuator members 228, 229 (see Figs. 10 and 14) are rectangular in shape and disposed in side-by-side relation to extend between the vertically spaced shifter shafts 153, 154 so as to lie adjacent the respective bottom and top sides of the latter.

The actuator members 225, 226 and 228, 229 are relatively spread a predetermined distance parallel to the shifter shafts by power means to be described. Those shifter shafts having projections disposed in the paths of the actuator will automatically be shifted to their opposite axial positions. The rotational position of each shifter shaft thus determines whether or not it is moved as the actuators are spread relative to one another.

In accordance with one feature of the invention axial positioning of the shifter shafts 150–154 and their corresponding clutches takes place simultaneously in response to the energization of a single power means. For this purpose, power means is provided for imparting opposite reciprocating movement to the actuator members 225, 226 and 228, 229, i. e., a relative expansion and contraction of these members parallel to the shifter shafts.

As shown best in the present case by Figs. 3, 4, 5, 8 and 10, such power means may take the form of two double-acting pneumatic rams 230 and 230a formed one above the other in a single body bolted to the base plate 158. While one such ram would serve effectively, two are employed in the present instance to conserve space and afford the necessary force when energized from a relatively low pressure air source. Since the two rams 230 and 230a are substantially identical, a description of the first will suffice for both.

With more particular reference to Fig. 8, the ram 230 comprises a cylinder body 232 closed at its ends by bulkheads 233 and 234, there being two opposed pistons 235, 236 axially slidable in the housing and having respective piston rods 238, 239 extending in sealed relation through central bores in the bulkheads. The pistons define a first chamber 240 therebetween, and with the bulkheads, second and third chambers 241 and 242 on their opposite sides. Ports 244, 245 and 246 in the cylinder body 232 communicate with the respective chambers. With air pressure supplied to the chambers 241 and 242, and the chamber 240 vented, the pistons 235 and 236 normally reside in the adjacent positions illustrated. However, with the chambers 241 and 242 vented and air pressure supplied to the chamber 240, the pistons are spread axially apart.

In order to unify the two rams 230 and 230a, the piston rods extending from them are rigidly connected to opposite end plates 245, 246 (see also Figs. 3 and 5). The latter plates mount at their upper ends the actuator members 225 and 226, respectively, and at their lower ends the actuator members 228 and 229, respectively. In each case the actuator members extend axially along the side of the rams and thence transversely of the rams to present their operative portions axially intermediate the projections on the shifter shafts 150–154. It will be understood from the foregoing that the actuator members 225, 226 are disposed between the projections on the shifter shafts 150–152, while the actuator members 228, 229 are disposed between the projections on the shifter shafts 153 and 154. Thus, expansion and contraction of the ram pistons reciprocates the actuator members 225, 226 and 228, 229 along their respective shifter shafts a distance limited by the stroke of the pistons. If a projection on any one of the shafts is disposed in the path of one of the actuators, that shaft and its corresponding clutch is axially shifted by the actuators.

Figure 4:
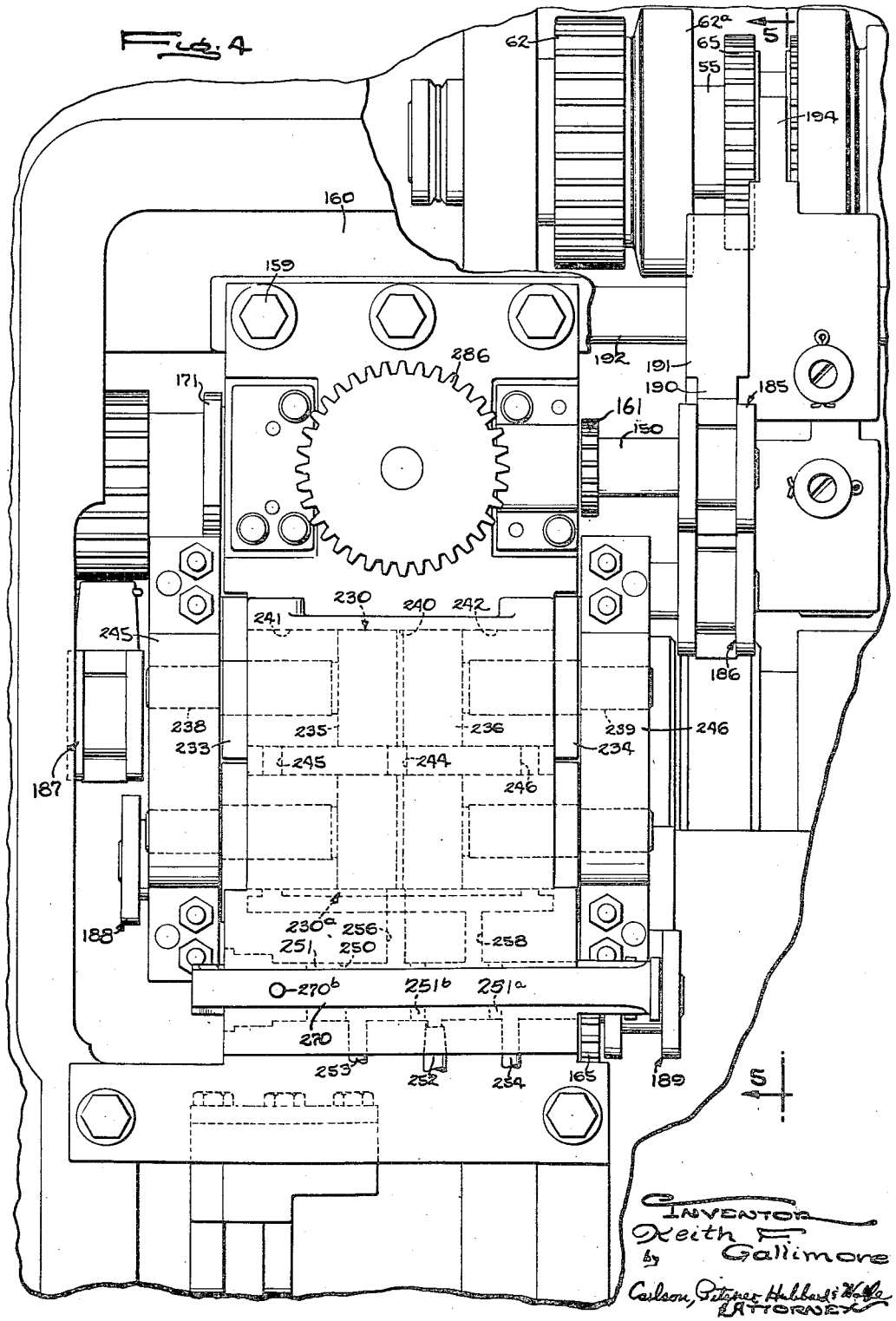
Fig. 4 is a vertical longitudinal section, taken substantially along the line 4—4 in Fig. 3.

For controlling the energization of the ram 230, 230a, a self-return pneumatic valve is formed in the cylinder body 232 beneath the lower ram 230a. Referring to Fig. 11, the body contains a longitudinal bore 250 receiving a spool valve 251 having lands 251a, 251b and 251c slidable on the inner wall of the bore. At the bottom, three ports 252, 253 and 254 are provided, the first being adapted for connection to a source of air pressure (not shown) and the latter two being vented to the atmosphere. Additional ports 256 and 258 communicate between the upper side of the bore 250 and the ram cylinders, the former bore extending into the central chamber of the lower ram which in turn communicates with the central chamber 240 of the ram 230 via the port 244 (Fig. 4). In like manner, the port 258 communicates with both end chambers of the two rams. Accordingly, with the valve member positioned as shown in Fig. 11, air pressure is supplied from the port 252 to the end chambers of the rams, while the center chambers are vented through the ports 256 and 258.

The spool valve 251 is normally biased to the position shown in Fig. 11 by a compression spring 260 disposed in what may be termed a dashpot chamber 261. A closure block 262 in the left end of the bore is formed with a central cavity 263 containing a movable check ball 264 adapted to seat in the left end of the cavity. Thus when the spool 251 is shifted to the left, the ball 264 uncovers a passage 265 communicating with the dashpot chamber 261, permitting air to escape from the latter via a second passage 266. However, when the spool is released and tends to move back to its original position under the influence of the spring 260, the ball 264 covers the passage 265, letting air seep slowly into the dashpot chamber and permitting the spool 251 to return slowly to its original position.

For the purpose of shifting the spool valve 251 to the left (Fig. 11), a slide 270 is dovetailed in the front of the valve body 232. The slide 270 has an inturned forked end 270a engaged with a yoke 251d on the right end of the spool 251, and a forwardly projecting pin 270b (see also Fig. 5). The pin 270b is received in a slotted finger 272 carried on the inner end of a stub shaft 274 (Fig. 3) which mounts the control lever 44. Deflection of the control lever 44 through a short arc in a clockwise direction as viewed in Fig. 1 thus shifts the spool 251 to the right, permitting the latter to supply air pressure between the opposed pistons for the rams 230, 230a. The pistons thus spread apart. The control lever 44 may be released immediately, and the spool valve 251 will slowly return to its original position due to the action of the spring 260 and the check ball 264. This retarded return of the spool valve 251 assures that there is ample time for actuation of the ram pistons through their complete stroke even though the control lever 44 is released immediately after being rocked in a clockwise direction. When the spool valve does reach its original position, however, the ram pistons and the actuator members are also returned to their original positions.

The continuous and intermittent gears 161–165 and 171–174 constitute effective and compact means for indexing the several shifter shafts 150–154 to any one of a plurality of rotational position patterns, thus bringing selected ones of the projections on the shifter shafts into the paths of the actuator members 225, 226 and 228, 229. It will be seen from Figs. 3, 5 and 6 that all of the shifter shafts are rotatably positioned by turning the speed selector crank 43 which is journaled in a casing 280 bolted to the front of the headstock housing 38. The crank 43 has on its inner end an integral spur gear 281 forming the input element of a speed reduction gear train rotatably connecting the selector crank 43 and the first shifter shaft 150. This latter gear train includes a second spur gear (not shown) driven from the gear 281, a third spur gear 283 fast on the inner end of a stub shaft 284, a fourth spur gear (not shown) and a fifth spur gear 286. The latter is fast on a journaled shaft 288 (Fig. 6) which in turn carries a bevel gear 289 mating with a second bevel gear 290 fast on a shaft 291. The latter shaft carries a spur gear 292 acting on an idler gear 294 which in turn drives the spur gear 161 on the first shifter shaft 150.

By this arrangement, rotation of the hand crank 43 drives all of the shifter shafts 150–154 in a manner to be more fully described. In order that the combined rotational positions or "pattern" of the shifter shafts may be known to an operator, the indicator dial 42 is adapted to be rotated in timed relation to the hand crank 43 and the shifter shafts. For this purpose, the dial 42 is journaled on the shaft of the crank 43 (Fig. 3), and formed with an internal ring gear 42a. A pinion 284a on the outer end of the shaft 284 meshes with this internal ring gear.

The outer face of the dial 42 is suitably marked with indicia indicating the paired spindle speeds resulting from positioning of the dial relative to a stationary pointer 42b and a subsequent deflection of the control lever 44. As shown best in Fig. 9, the face of the dial 42 is divided into a first plurality of circularly spaced segments 42c, there being twenty-four such segments for indicating each of the eight "high" spindle speeds in three positions of the dial. A second concentric plurality of circular segments 42d contain indicia indicating each of the twenty-four "low" spindle speeds. Upon reference to the preceding spindle speed table, it will be seen that the dial as shown in Fig. 9 is set to speed No. 1 paired with speed No. 2. Thus, the dial indicates that with the clutches 84 and 125 shifted to the right, the spindle will be driven at 350 R. P. M. while with the clutches 84 and 125 shifted to the left, the spindle speed will be 5.5 R. P. M. If it is desired to operate at the same "high" speed but at a different one of the paired "low" speeds, i. e., speeds Nos. 3 and 4 in the chart, the hand crank 43 is turned until "350" in the outer ring of indicia appears opposite the pointer 42b and either "22" or "88" in the inner ring of indicia is opposite the pointer 42b.

Preferably, the gear reduction ratio between the selector crank 43 and the dial 42 is 24:1 so that each revolution of the crank rotates the dial to the next succeeding pair of concentric indicia. Also, the speed ratio between the selector crank 43 and the first shifter shaft 150 is preferably chosen as 4:1, so that each time the dial rotates through one pair of concentric indicia, the shifter shaft 150 is turned 90°.

In the specific embodiment illustrated by the drawing, the Geneva gears 171, 172 (Figs. 3 and 13) connecting the shifter shafts 150 and 151 provide for intermittent rotation of the latter shaft as the former rotates continuously. The dwell period for the shaft 151 lasts for 90° of rotation of the shaft 150. The dwell is followed by 90° rotation of the shaft 151 for the subsequent 90° of rotation of the shaft 150. Similarly, the Geneva gears 162, 163 (Figs. 5 and 13) interconnecting the shifter shafts 151 and 152 provide intermittent rotation of the latter shaft. The dwell period for the latter shaft continues over 270° rotation of the former shaft, followed by rotation of the latter shaft 90° for the subsequent 90° rotation of the former shaft. The continuous spur gears 173, 174 interconnecting the shifter shafts 152 and 153 (Figs. 3 and 13) effect a stepped up drive or ratio of 4:3. The shifter shaft 153 is therefore driven intermittently by the intermittent rotation of the shaft 152 but, due to the step up ratio, the former shaft rotates 120° for each 90° rotation of the latter shaft. The spur gears 164, 165 (Figs. 5 and 13) effect a direct drive at a 1:1 ratio of the shifter shaft 154 from the shifter shaft 153. Thus, these two shafts rotate and dwell in unison. For each setting of the indicated dial 42, there is a corresponding, predetermined rotational position for each of the shifter shafts 150—154, and also a predetermined corresponding rotational position pattern for all of the shafts taken together.

*Operation of the speed preselector and shifting device*

As illustrated in Fig. 13, the shifter shafts 150—154 have been rotationally indexed to that pattern necessary for setting the clutches 65, 71, 78, 101 and 114 to the first "high" speed (No. 1 in the preceding table) of 350 R. P. M., or the paired "low" speed of 5.5 R. P. M. (No. 2 in the table) depending upon the manual setting of the clutches 84 and 125. As shown, the projections 212 and 215 on the respective shafts 150 and 152 extend vertically to lie in the paths of the respective actuator members 225 and 226. The projection 214 lies horizontally in the path of the actuator member 226. In like manner, the projections 218 and 219 on the responsive shafts 153 and 154 extend downwardly and upwardly to lie in the paths of the respective actuators 229 and 228. Thus, when the actuators are mutually spread by energization of the rams 230 and 230a, they slip freely by the projections 211, 213, 216, 217 and 220, but engage the remaining projections to shift the shafts 150—154 to the axial position pattern R, R, L, R, L. Accordingly, the clutches 67, 71, 78, 101 and 114 are shifted to the same position pattern and provide spindle speeds No. 1 or No. 2 as shown in the preceding table. If one or more of the shafts 150—154 were originally in the desired axial position, it would not be moved at all since its projection extending toward one of the actuators would lie at the end of the actuator stroke.

While the machine is being operated in speed No. 1 or No. 2, any of the other paired speeds may be preselected by turning the hand crank 43 and resetting the dial 42. For example, if paired speeds No. 5 and No. 6 are desired, the dial is set with "420"—"6.5" opposite the pointer 42b. In reaching this setting of the dial, the shaft 150 is rotated through 90° from the position shown in Fig. 13 to the position shown in Fig. 14. This places the projection 211 in the path of the actuator 225, and withdraws the projection 212 from the path of the actuator 226. None of the remaining shafts 150—154 rotates since the gear 172 dwells over this interval. Subsequently, after the operation at speed No. 1 or No. 2 is complete and the machine is momentarily stopped, the operator flips the control lever 44, thereby shifting the valve 251 and momentarily energizing the rams 230, 230a. This spreads the actuators 225, 226 and the first of these engages the projection 211 to shift the shaft 150 to the left, while all of the remaining shifter shafts remain stationary. The clutch pattern is thus changed to L, R, L, R, L as required (see the preceding table) and operation at the newly selected speed may begin immediately.

It will be understood by those skilled in the art that any suitable arrangement may be provided to "jog" the transmission shafts while shifting is actually taking place. This ensures that the cooperating teeth of the clutches being shifted do not "clash," but rather slide smoothly into mating engagement. In one form, such jogging action might be provided by a control circuit (not shown) for intermittently energizing the motor 41 as long as the actuators are out of their normal or "home" positions.

If it is desired to operate the spindle optionally at the first high speed of 350 R. P. M. or at the paired low speed of 22 R. P. M. (speed No. 3), the selector crank 43 is turned until the speed indicating indicia "350"—"22" are opposite the pointer 42b. Rotation of the selector crank 43 acting through the intermittent and continuous gears on the shifter shafts 150—154 indexes the latter to the rotational position pattern illustrated diagrammatically in Fig. 21. This indexing may take place while the machine is in operation at any other speed. The resulting rotational positions of the shifter shafts locate the projections 211 and 214 in the path of the actuator 226 and, in a similar manner locates the projections 215 and 217, 219 in the paths of the respective actuators 225 and 228. Thus, when the machine is temporarily stopped and the control lever 44 flipped to energize the rams 230, 230a, the resulting mutual spreading of the actuators 225, 226 and 228, 229 shift the shafts 150—154 to the combined axial positional pattern R, R, L, L, L. This shifts the clutches 65, 71, 78, 101 and 114 to the necessary positions, indicated in the preceding speed table, for operation of the spindle at either 350 R. P. M. or 22 R. P. M. depending upon the manual setting of the clutches 84 and 125.

In like manner, any one of the eight "high" speeds may be preselected and paired with one of its corresponding three "low" speeds. Setting the dial 42, and thus actuating the Geneva gear train, causes the shifter shafts 150—154 to be indexed to the proper rotational position pattern. To take some specific examples, Fig. 15 diagrammatically illustrates the combined rotational settings of the shifter shafts 150—154 necessary to produce shifting for operation optionally at 500 R. P. M. or 8 R. P. M., i. e., speed Nos. 9 and 10 in the preceding table It will be observed from Fig. 15 that projections 212, 213, 215, 218 and 219 are disposed in the paths of the corresponding actuators, while the projections 211, 214, 216, 217 and 220 are withdrawn. Thus, when the rams 230, 230a are energized, the actuator 226 will engage the projection 212 and shift the shaft 150 to the right, if the shaft is not already in its right position. In the same way, the actuator 225 will engage the projections 213 and 215 to shift the shafts 150 and 152 to the left. Simultaneously, the actuators 229 and 228 will engage the projections 218 and 219 to shift the shafts 153 and 154 to the right and left, respectively. This provides the necessary axial position pattern, i. e., R, L, L, R, L for operation at a spindle speed of 500 R. P. M. or 8 R. P. M. depending upon the setting of the clutches 84 and 125.

Fig. 16 illustrates the rotational positions of the shifter shafts 150-154 when the indicator dial 42 has been set with the indicia "600"—"9" opposite the pointer 42b. This results, as shown, in the projections 211, 213, 215, 218 and 219 being disposed in the path of one of the actuators. Accordingly, upon relative reciprocating movement of the actuators the shafts 150-154 are shifted to axial positional pattern, L, L, L, R, L. In like manner, the shifter shafts 150-154 are rotatably indexed as shown in Fig. 17 to effect operation of the spindle at the paired speeds 705 and 11 R. P. M. With the dial 42 properly set, the projections 214, 213, 216, 218 and 219 extend into the path of one of the actuators. Relative axial separation of the latter thus shifts the shafts 150-154 and their corresponding clutches to the axial position pattern R, R, R, R, L.

For operation optionally at a spindle speed of 835 or 13 R. P. M. the shifter shafts 150-154 are rotationally indexed, upon setting of the dial 42, as shown in Fig. 18. The projections 211, 214, 216, 218 and 219 extend into the path of one actuator so that energization of the rams 230, 230a shifts the shafts to the axial pattern, L, R, R, R, L. In Fig. 19, the rotational position pattern of the shafts 150-154 is shown for obtaining operation of the spindle optionally at speeds of 1,000 or 16 R. P. M. Here, the projections 212, 213, 216, 218 and 219 lie in the path of one of the actuators so that spreading of the latter produces the axial position pattern, R, L, R, R, L. The position pattern L, L, R, R, L necessary to provide spindle operation at optional speeds of 1200 or 19 R. P.M. is illustrated in Fig. 20, wherein the projections 211, 213, 216, 218 and 219 extend into the path of one of the actuator members.

In summary, it will now be understood that the multispeed transmission and preselector shifting device for positioning the several clutches in the transmission provide for unusually fast and convenient changing of the machine tool for operation at any one of a great plurality, in this instance thirty-two, of spindle speeds. Operation optionally at one of the eight "high" speeds or at any one of three "low" speeds paired with it may be effected simply by manually positioning the control lever 45 to complementally shift the clutches 84 and 125 in unison. This does not entail shifting of any of the remaining clutches in the multi-speed transmission.

When it is desired to change from one to another selected pair of high and low speeds, the selecting operation may be carried out while the machine is in operation simply by turning the crank 43 to set the indicator dial 42. Subsequently, a simple deflection of the control lever 44 causes the actuator members to shift selected ones of the shifter shafts 150-154 thereby producing the necessary axial positional pattern for the clutches 65, 71, 78, 101 and 114. Only those clutches which are originally out of the position required for the desired pattern are moved. The remaining ones are left entirely stationary in arriving at the new speed setting.

I claim as my invention:

1. In a machine tool, the combination of a multispeed transmission with a speed preselector device; said transmission comprising rotatable driving and driven elements, a fixed ratio speed reduction gearing, first and second speed change gearings each including a plurality of clutches shiftable between two positions to effect different speed change ratios, means tandemly connecting said first and second speed change gearings between said driving element and said speed reduction gearing, means drivingly connecting said driven element to said first speed change gearing optionally through (a) said second speed change gearing and said speed reduction gearing and (b) through said first speed change gearing independently of said second speed change gearing and said speed reduction gearing, the ratio of said speed reduction gearing being approximately equal to the maximum speed reduction ratio afforded by said first speed change gearing; and a preselector device including a plurality of rotatable and axially movable shifter shafts operatively connected with respective ones of said clutches to shift the latter upon axial movement of the former, and means for simultaneously and axially shifting those shifter shafts indexed to predetermined rotational positions according to a preselected pattern, whereby said driven element may have any one of a plurality of speeds when connected through said first speed gearing and a corresponding one of a plurality of speeds when connected through said speed reduction gearing, as determined by the preselected positional pattern of said clutches.

2. In a machine tool having a prime mover and a rotatable spindle, a multispeed transmission comprising, in combination, a first speed change gear train driven by the prime mover and including a first plurality of two-position shiftable clutch means, fixed ratio speed reduction gearing, a second speed change gear train including a second plurality of two-position shiftable clutch means, said second gear train being drivingly interconnected between said first gear train and said speed reduction gearing, means for effecting driving connection to the spindle optionally from (a) said first gear train independently of said second gear train and (b) from said first gear train through said second gear train and said speed reduction gearing, the ratio of said speed reduction gearing being approximately equal to the maximum reduction ratio afforded by said first gear train, a plurality of rotatable shifter shafts parallel with one another and axially movable between two positions, a pair of axially and circumferentially spaced radial projections on each of said shafts, a pair of actuating members disposed axially intermediate each pair of projections, means for relatively expanding and contracting said members axially of said shafts, means for rotatably indexing each of said shafts to locate a selected one of each pair of projections in the path of one of said members whereby expansion of the latter places each shaft in a preselected axial position according to its indexed position, means connecting each of said shafts with a corresponding one of said clutch means to shift the latter upon axial movement of the former, whereby said clutch means may be shifted into any one of a plurality of position patterns, there being one of a plurality of spindle speeds selected with drive through said speed reduction gearing for each spindle speed obtained by drive through said first gear train alone.

3. In a machine tool headstock having a prime mover and a rotatable spindle, a multispeed transmission for driving the spindle from the prime mover comprising, in combination, a first speed change gear train driven from the prime mover and including a first plurality of shiftable clutch means, fixed ratio speed reduction gears, a second gear train including a second plurality of shiftable clutch means, said second gear train being drivingly interconnected between said first gear train and said speed reduction gears, means including a first clutch for effecting disengageable drive of the spindle through said first and second gear trains and said speed reduction gears, means including a second clutch for effecting disengageable drive of the spindle through said first gear train independently of said second gear train and said speed reduction gearing, means for complementally shifting said first and second clutches to effect drive of the spindle optionally from (a) said first gear train independently of said second gear train and (b) said speed reduction gears through said first and second gear trains, the ratio of said speed reduction gears being approximately equal to the maximum speed reduction ratio afforded by said first gear train, a plurality of parallel, rotatable shifter shafts axially movable between first and second positions, a pair of axially and circumferentially spaced radial projections on each of said shafts, a pair of actuators disposed axially intermediate each pair of projections, means for relatively expanding and contracting said actuators along axial paths adjacent said shifter shafts, a Geneva gear train for rotatably indexing all of said shafts to place selected ones of each pair of projections in the paths of said actuators, and means connecting each shifter shaft upon axial movement thereof to shift a corresponding one of said clutch means, whereby the spindle is operable at two predetermined speeds for each position pattern of said clutch means by manually shifting said pair of clutches without disturbing such position pattern.

4. In a machine tool having a prime mover and a rotatable spindle, the combination of a multispeed transmission drivingly interconnecting the prime mover and spindle, said transmission including first and second pluralities of shiftable clutch means operative to produce variations in the speed change ratio of the transmission, manually controlled means for optionally driving the spindle (a) through said first plurality of clutch means and (b) through both said first and second pluralities of clutch means, and a preselector device for simultaneously shifting each of said clutch means to a predetermined position to afford different speed change ratios, preselection of any one of a plurality of spindle speeds afforded by both said pluralities of clutch means being possible with each spindle speed afforded by said first plurality of clutch means alone.

5. In a machine headstock having a rotatable spindle, the combination of a multispeed transmission including a plurality of clutches shiftable to effect speed changes, a plurality of axially movable and rotatable shifter shafts each connected to shift one of said clutches upon axial movement, a pair of axially and circumferentially spaced projections extending from each of said shifter shafts, a pair of actuators extending transversely with respect to said shifter shafts in the region of said projections and adapted to engage those projections in a predetermined rotational position upon axial movement relative to the shifter shafts, and means for indexing said shifter shafts to any of a plurality of predeterimned rotational position patterns to thereby cause shifting of preselected ones of said clutches upon movement of said actuators axially along said shafts.

6. In a machine tool having a prime mover and a rotatable spindle, the combination with power transmission means including a clutch drivingly connecting the prime mover and the spindle, said clutch being shiftable between two positions to provide two respective speed ratios for said transmission means; of means for shifting said clutch comprising a rotatable and axially movable shifter shaft operatively connected to said clutch, an actuator adjacent said shaft and reciprocal along its axis, means for rotatably indexing said shaft, and means for shifting said shaft axially from one position to the other in response to movement of said actuator only when said shaft is in certain predetermined rotational positions.

7. For use with a prime mover and an element to be rotatably driven thereby, the combination with a multispeed power transmission drivingly connecting the prime mover and the element and including a plurality of clutches each shiftable between two positions to change the speed ratio of the transmission; of means for simultaneously placing each of said clutches in a preselected one of its positions, said means comprising a plurality of parallel, rotatable axially reciprocal shifter shafts, means connecting each of said shafts to shift a corresponding one of said clutches upon axial movement of the shaft, means for rotatably indexing each of said shafts, a pair of actuators adjacent all of said shafts and oppositely reciprocal along their axes, and means engaged by said actuators to axially shift each of said shafts from one position to the other only when that shaft is in certain predetermined rotational positions.

8. In a machine tool having a prime mover and a rotatable spindle, the combination with a multispeed transmission drivingly connecting the prime mover and the spindle and including a plurality of clutch means each shiftable between two positions to change the speed ratio of the transmission; of means for simultaneously placing each of said clutch means in a predetermined one of its positions to provide a preselected speed raio, said means comprising a plurality of parallel, rotatable shifter shafts axially movable between two positions, means connecting each of said clutch means to be shifted upon axial movement of a corresponding one of said shafts yet permitting rotation of the latter, a pair of axially and circumferentially spaced radial projections on each of said shafts, a pair of actuator members adjacent all of said shafts and disposed axially intermediate said projections, means for relatively spreading said actuator members along the axes of said shafts, and means for rotatably indexing each of said shafts to place certain ones of said projections in the paths of said actuator members, whereby selected ones of said shafts and clutch means are shifted upon movement of said actuator members.

9. In a machine tool having a prime mover and a rotatable spindle, the combination with a multispeed transmission drivingly connecting the prime mover and the spindle and including a plurality of clutch means each shiftable between two positions to change the speed ratio of the transmission; of means for simultaneously placing each of said clutch means in a predetermined one of its positions to provide a preselected speed ratio, said means comprising a plurality of parallel, rotatable shifter shafts axially movable between two positions, means connecting each of said clutch means to be shifted upon axial movement of a corresponding one of said shafts yet permitting rotation of the latter, a pair of axially and circumferentially spaced radial projections on each of said shafts subtending mutually exclusive arc concentric with the axis of said shafts, a pair of actuator members adjacent all of said shafts and disposed axially between said projections, means for spreading said actuator members along the axes of said shafts, and a Geneva gear train rotatably interconnecting all of said shafts for indexing the same to rotational positions according to any one of a plurality of predetermined patterns, one of said projections on each shaft extending into the path of said actuator members in each instance, whereby selected ones of said shafts and clutch means are shifted upon movement of said actuator members.

10. In a machine tool headstock having a constant speed motor and a rotatable spindle, the combination with a multi-speed transmission including a plurality of shiftable clutches drivingly connecting said motor and spindle; of a speed preselector device comprising a plurality of parallel rotatable shifter shafts axially movable between two positions, means connecting each of said clutches to be shifted upon axial movement of a corresponding one of said shafts yet permitting rotation of the latter, a pair of axially separated, radially extending projections on each of said shafts lying in mutually exclusive arcs concentric with the axis of that shaft, a pair of actuators adjacent said shafts and disposed axially between said projections thereon, power means for spreading and returning said actuators along paths parallel to the axes of said shafts, a control shaft and means including a Geneva gear train for rotatably indexing said shifter shafts upon rotation of the control shaft according to a predetermined cycle to thereby bring selected ones of said projections into the paths of said actuators to shift predetermined ones of said shifter shafts and clutches.

11. A preselector device comprising, in combination, a plurality of rotatable shafts axially shiftable between two positions, a pair of radial projections axially and circumferentially spaced on each of said shafts, a pair of actuators disposed adjacent all of said shafts and axially between the paired projections on each, means for separating and returning said actuators along paths parallel to said shafts, and means for rotatably indexing each of said shafts to bring one or the other of said projections into the paths of said actuators, whereupon movement of said actuators axially shifts predetermined ones of said shafts from their original positions to simultaneously position all of said shafts according to a predetermined pattern.

12. In a device for simultaneously shifting a plurality of two-position clutches to positions corresponding to a preselected one of several patterns, the combination comprising a plurality of rotatable and axially movable shafts adapted to shift corresponding ones of the clutches upon axial movement, a pair of projections axially and circumferentially spaced frm one another on each of said shafts, a pair of actuating members disposed adjacent one side of all said shafts, power means for relatively expanding and contracting said members longitudinally of the shafts, a gear train rotationally connecting said shafts, input means for energizing said gear train to rotatably index said shafts and bring selected ones of said projections into the paths of said actuator members, whereby said members shift selected ones of said shafts and leave the others stationary to create the preselected position pattern for said clutches.

13. In a device for simultaneously shifting a plurality of two-position clutches to a preselected one of several positional patterns, the combination comprising a plurality of rotatable and axially movable shifter shafts disposed in a parallel array, means connecting each of said shifter shafts with a corresponding one of the clutches to shift the latter upon axial movement of the former, a pair of axially and circumferentially spaced projections extending radially from each of said shifter shafts, a pair of side-by-side actuator members extending transversely into proximity with said shifter shafts axially intermediate the projections thereon, a hydraulic ram for mutually spreading and retracting said actuator members along paths parallel to the axes of said shifter shafts, a valve for controlling the energization of said ram, a gear train including intermittent gears rotationally interconnecting said shifter shafts, means for energizing said gear train to thereby place said shifter shafts in any one of a plurality of rotational position patterns with predetermined ones of said projections extending into the paths of said actuator members, whereby energization of said ram creates a predetermined position pattern of said clutches determined by the rotational position pattern of said shifter shafts.

14. The combination set forth in claim 13 wherein said valve includes dashpot means for automatically returning it to its original position after a predetermined time delay from the instant that it is shifted to its ram-energizing position.

15. In a device for positioning a plurality of movable elements according to a preselected one of several position patterns, the combination comprising a plurality of rotatable, axially movable shifter shafts, means adapting each of said shifter shafts upon axial movement thereof to position one of the movable elements, means including a Geneva gear train interconnecting said shifter shafts for setting them in any one of a plurality of rotational position patterns, and means for axially shifting each of said shifter shafts only when the latter has a predetermined rotational position.

16. In a preselector device, the combination of a plurality of rotationally and axially movable shifter shafts, means including a Geneva gear train interconnecting said shafts for setting them in any one of a plurality of combined rotational positional patterns, and means operative only when each of said shafts is in a predetermined rotational position for axially shifting that shaft, whereby said shafts may be set to any one of a plurality of axial position patterns preselected by the rotational position pattern of said shafts.

17. In a preselector device for positioning a plurality of two-position clutches according to any one of a plurality of position patterns, the combination of a plurality of rotationally and axially movable shifter shafts, means connecting each of said shifter shafts upon axial movement thereof to correspondingly move one of the clutches, a single multi-position control member and means for indexing said shafts to any one of a plurality of rotational position patterns according to the position of said control member, a pair of actuators adapted for opposite reciprocal movement along said shafts, and means on each of said shafts engageable with said actuators to axially shift that shaft only when it is in a predetermined rotational position, whereby reciprocation of said actuators sets the clutches in a position pattern preselected by the rotational position pattern of said shifter shafts.

18. For use in a machine tool headstock having a constant speed driving motor and a spindle driven from the motor, a multi-speed transmission comprising, in combination, a fixed ratio speed reduction gearing, a fixed ratio speed step-up gearing, first and second speed change gearings having a plurality of shiftable clutches each providing a plurality of selectable speed reduction ratios including a ratio of approximately 1:1, said first and second speed change gearings being connected in tandem relation to be driven by the motor, means including a first clutch and said speed reduction gearing for disengageably driving the spindle from said second speed change gearing, means for driving the spindle from said speed step-up gearing, means including a second clutch for driving said speed step-up gearing from said first speed change gearing independently of said second speed change gearing, and means for complementally shifting said first and second clutches to effect drive of the spindle optionally (a) at a plurality of "low" speeds through said speed reduction gearing and (b) at a plurality of "high" speeds through said speed step-up gearing, the ratio of said speed reduction gearing being approximately equal to the maximum speed reduction ratio afforded by said first speed change gearing and said speed step-up gearing combined, whereby the highest "low" speed of the spindle is approximately equal to the lowest "high" speed of the spindle.

19. For use in a machine tool headstock having a constant speed driving motor and a spindle driven from the motor, a multi-speed transmission comprising, in combination, a fixed ratio speed reduction gearing, a fixed ratio speed step-up gearing, first and second speed change gearings each providing a plurality of selectable speed change ratios and being connected in tandem relation to be driven by the motor, means for driving said speed reduction gearing from said second speed change gearing, means for driving the spindle from said speed reduction gearing, one of said two last-named means including a first clutch, means for driving said speed step-up gearing from said first speed change gearing independently of said second speed change gearing, means for driving the spindle from said speed step-up gearing, one of said two last-named means including a second clutch, and means for complementally shifting said first and second clutches to effect drive of the spindle optionally (a) at a plurality of "low" speeds through said first and second speed change gearings and said speed reduction gearing and (b) at a plurality of "high" speeds through said first speed change gearing and said speed step-up gearing, the ratio of said speed reduction gearing being approximately equal to the maximum speed reduction ratio afforded by said first speed change gearing and said speed step-up gearing combined, whereby the highest "low" speed of the spindle is approxibately equal to the lowest "high" speed of the spindle.

20. A multi-speed transmission comprising the combination of rotatable driving and driven elements, a fixed ratio speed reduction gearing, a fixed ratio speed step-up gearing, first and second speed change gearings tandemly connected between said driving element and said speed reduction gearing, means including a first clutch drivingly connecting said first speed change gearing between said driving element and said speed step-up gearing independently of said second speed change gearing, means drivingly connecting said speed step-up gearing to said driven element, a second clutch drivingly connecting said speed reduction gearing and said driven element, and means for complementally shifting said first and second clutches to effect drive of said driven element optionally through (a) said first and second speed change gearings and said speed reduction gearing and (b) said first speed change gearing and said speed step-up gearing, the ratio of said speed reduction gearing being approximately equal to the maximum speed reduction ratio of said first speed change gearing, whereby the maximum speed for the driven element afforded by drive through said speed reduction gearing is only slightly less than the minimum speed of the driven element afforded by drive through said speed step-up gearing.

21. A multi-speed transmission comprising the combination of rotatable driving and driven elements, a fixed ratio speed reduction gearing, first and second speed change gearings tandemly connected between said driving element and said reduction gearing, a first clutch connecting said driven element for drive from said speed reduction gearing, means including a second clutch connecting said driven element for drive through said first speed change gearing independently of said second speed change gearing and speed reduction gearing, means for complementally shifting said first and second clutches in unison, and the ratio of said speed reduction gearing being approximately equal to the maximum speed reduction ratio afforded by said first speed change gearing.

References Cited in the file of this patent

UNITED STATES PATENTS

| | | |
|---|---|---|
| 1,266,584 | Gray | May 21, 1918 |
| 1,321,165 | Vincent | Nov. 11, 1919 |
| 2,071,359 | Randol | Feb. 23, 1937 |
| 2,110,994 | Linsley | Mar. 15, 1938 |
| 2,177,746 | Randol | Oct. 31, 1939 |
| 2,235,943 | Mylius | Mar. 25, 1941 |
| 2,247,920 | Neff | July 1, 1941 |
| 2,557,324 | Tomlinson | June 19, 1951 |
| 2,572,054 | Randol | Oct. 23, 1951 |